United States Patent
Yamaguchi et al.

(10) Patent No.: US 9,857,216 B2
(45) Date of Patent: Jan. 2, 2018

(54) MINUTE OBJECT CHARACTERISTICS MEASURING APPARATUS

(71) Applicants: Daichi Yamaguchi, Kanagawa (JP); Shuusuke Someno, Kanagawa (JP)

(72) Inventors: Daichi Yamaguchi, Kanagawa (JP); Shuusuke Someno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 105 days.

(21) Appl. No.: 14/980,706

(22) Filed: Dec. 28, 2015

(65) Prior Publication Data

US 2016/0187374 A1 Jun. 30, 2016

(30) Foreign Application Priority Data

Dec. 26, 2014 (JP) ................................. 2014-263976
Oct. 30, 2015 (JP) ................................. 2015-213591
Dec. 11, 2015 (JP) ................................. 2015-241945

(51) Int. Cl.
*G01H 17/00* (2006.01)
*G01Q 20/02* (2010.01)

(52) U.S. Cl.
CPC ............. *G01H 17/00* (2013.01); *G01Q 20/02* (2013.01)

(58) Field of Classification Search
CPC ........ B82Y 35/00; G01Q 10/00; G01Q 10/02; G01Q 10/04; G01Q 10/06; G01Q 10/065; G01Q 20/00; G01Q 20/02; G01H 7/00; G01H 11/001
See application file for complete search history.

(56) References Cited

U.S. PATENT DOCUMENTS

| | | | | |
|---|---|---|---|---|
| 5,260,567 A | * | 11/1993 | Kuroda | B82Y 35/00 250/227.19 |
| 6,229,609 B1 | * | 5/2001 | Muramatsu | B82Y 20/00 250/234 |
| 6,245,204 B1 | * | 6/2001 | Lindsay | B82Y 35/00 204/400 |

(Continued)

FOREIGN PATENT DOCUMENTS

| | | |
|---|---|---|
| JP | 9-189727 | 7/1997 |
| JP | 2003-330264 | 11/2003 |

(Continued)

OTHER PUBLICATIONS

Mizuguchi Yukiko, Miyamoto Takahito, "Measuring Non-Electrostatic Adhesive Force Between Solid Surfaces and Particles by Means of Atomic Force Microscopy", Konica Minolta Technical Report, vol. 1 (2004), pp. 19-22.

(Continued)

*Primary Examiner* — David E Smith
(74) *Attorney, Agent, or Firm* — Oblon, McClelland, Maier & Neustadt, L.L.P.

(57) ABSTRACT

A minute object characteristics measuring apparatus is provided. The minute object characteristics measuring apparatus includes a holder, a cantilever, a measuring device, and a driver. The holder holds a minute object. The cantilever faces the minute object held by the holder. The measuring device measures a displacement of the cantilever. The driver drives one of the holder holding the minute object and the cantilever in a direction that the minute object held by the holder and the cantilever are brought close to or drawn away from each other.

10 Claims, 24 Drawing Sheets

(56) References Cited

U.S. PATENT DOCUMENTS

| | | | | |
|---|---|---|---|---|
| 6,612,161 | B1* | 9/2003 | Prakash | B82Y 35/00 73/105 |
| 7,987,703 | B2* | 8/2011 | Konno | B82Y 35/00 73/105 |
| 8,910,311 | B2* | 12/2014 | Humphris | B82Y 35/00 850/1 |
| 2003/0011389 | A1* | 1/2003 | Nakayama | G01G 3/13 324/727 |
| 2006/0225490 | A1* | 10/2006 | Xi | B82B 3/00 73/105 |
| 2008/0223122 | A1* | 9/2008 | Watanabe | B82Y 35/00 73/105 |
| 2008/0292870 | A1* | 11/2008 | Das | B82B 3/00 428/323 |
| 2009/0000362 | A1* | 1/2009 | Hashiguchi | B81C 99/002 73/105 |
| 2009/0060602 | A1 | 3/2009 | Yamaguchi et al. | |
| 2009/0188011 | A1* | 7/2009 | Yasutake | B82Y 35/00 850/52 |

FOREIGN PATENT DOCUMENTS

| | | |
|---|---|---|
| JP | 2007-212367 | 8/2007 |
| JP | 2009-251050 | 10/2009 |
| JP | 2013-019714 | 1/2013 |
| JP | 2014-119305 | 6/2014 |

OTHER PUBLICATIONS

Yoshinori Nishitani, Hiroaki Muramatu, Hiroyuki Maruyama, Ken-Ichiro Tanoue ,Shuji Matsusaka, Masuda Hiroaki, "Collection of Papers for the Summer Symposium of The Society of Powder Technology", 41 (2005 )pp. 67-69, Aug. 4, 2005.

J. W. Kwek, I. U. Vakarelski, W. K. Ng, J.Y.Y. Heng, and R. B. H. Tan "Novel Parallel Plate Condenser for Single Particle Electrostatic Force Measurements in Atomic Force Microscope", Colloids and Surfaces A: Physicochem. Eng. Aspects 385 (2011) pp. 206-212,Jul. 20, 2011.

* cited by examiner

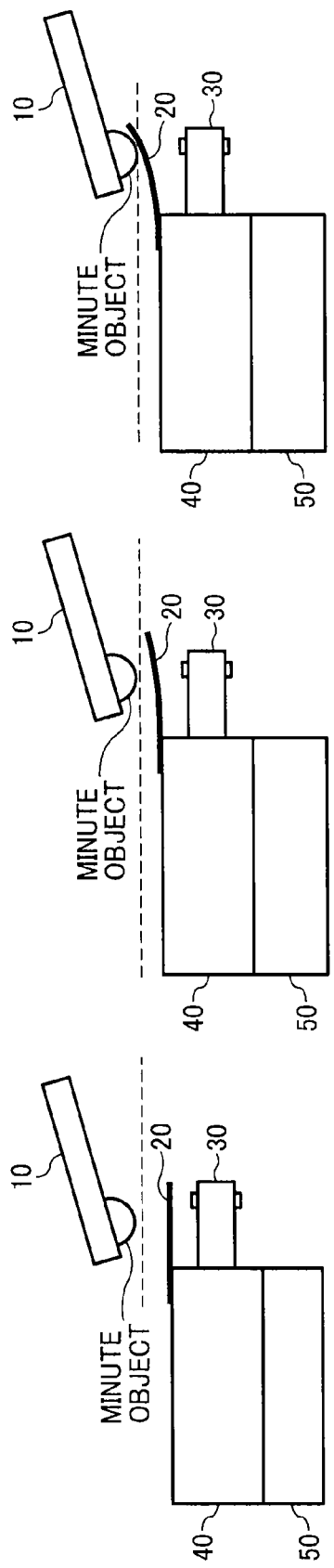

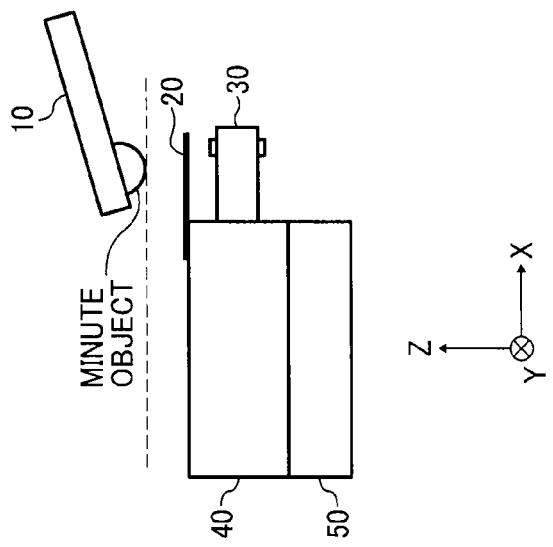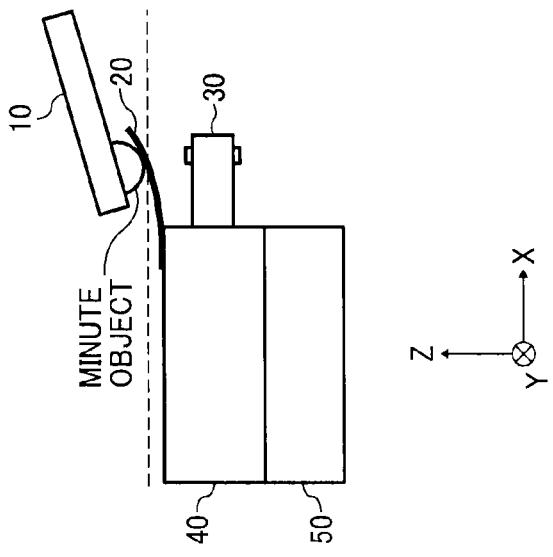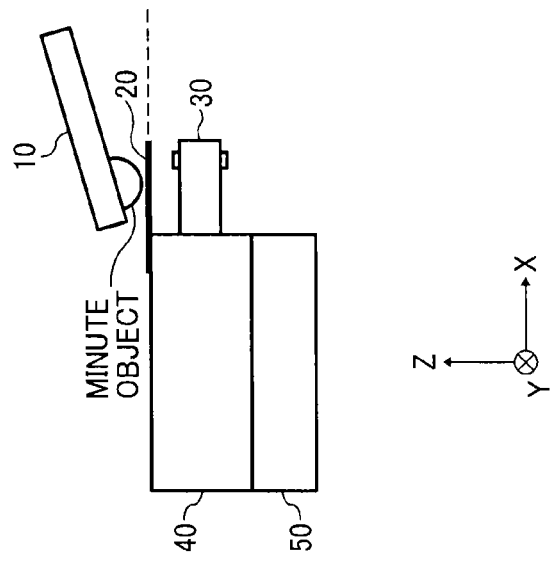

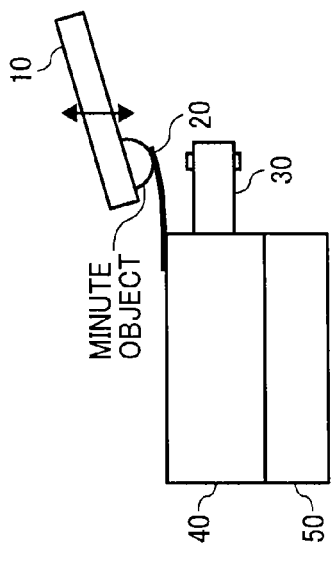 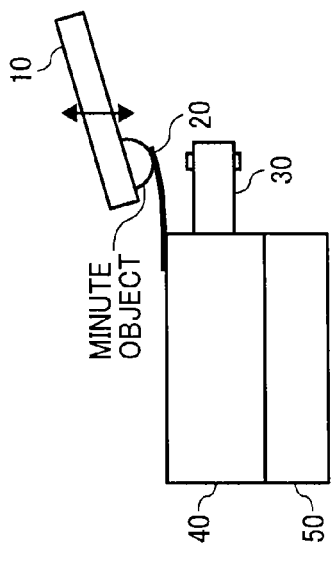 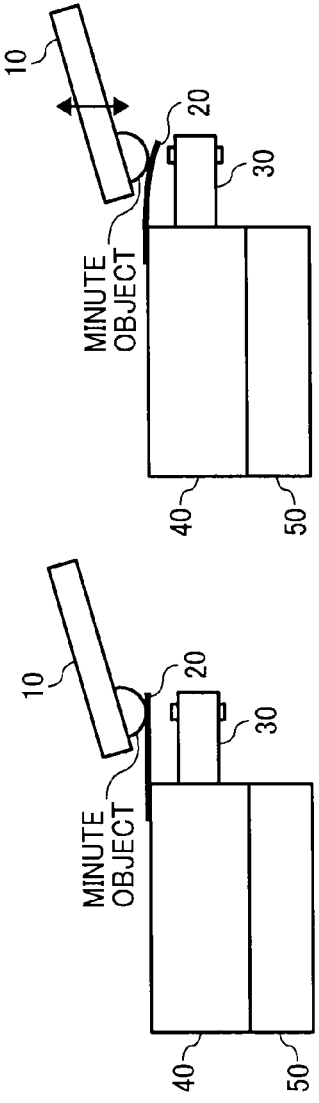

$$\frac{\sigma}{\gamma} \cos \delta$$

$\sigma$: STRESS, $\gamma$: DISTORTION, $\delta$: PHASE $$\frac{\sigma}{\gamma} \sin \delta$$

$\sigma$: STRESS, $\gamma$: DISTORTION, $\delta$: PHASE

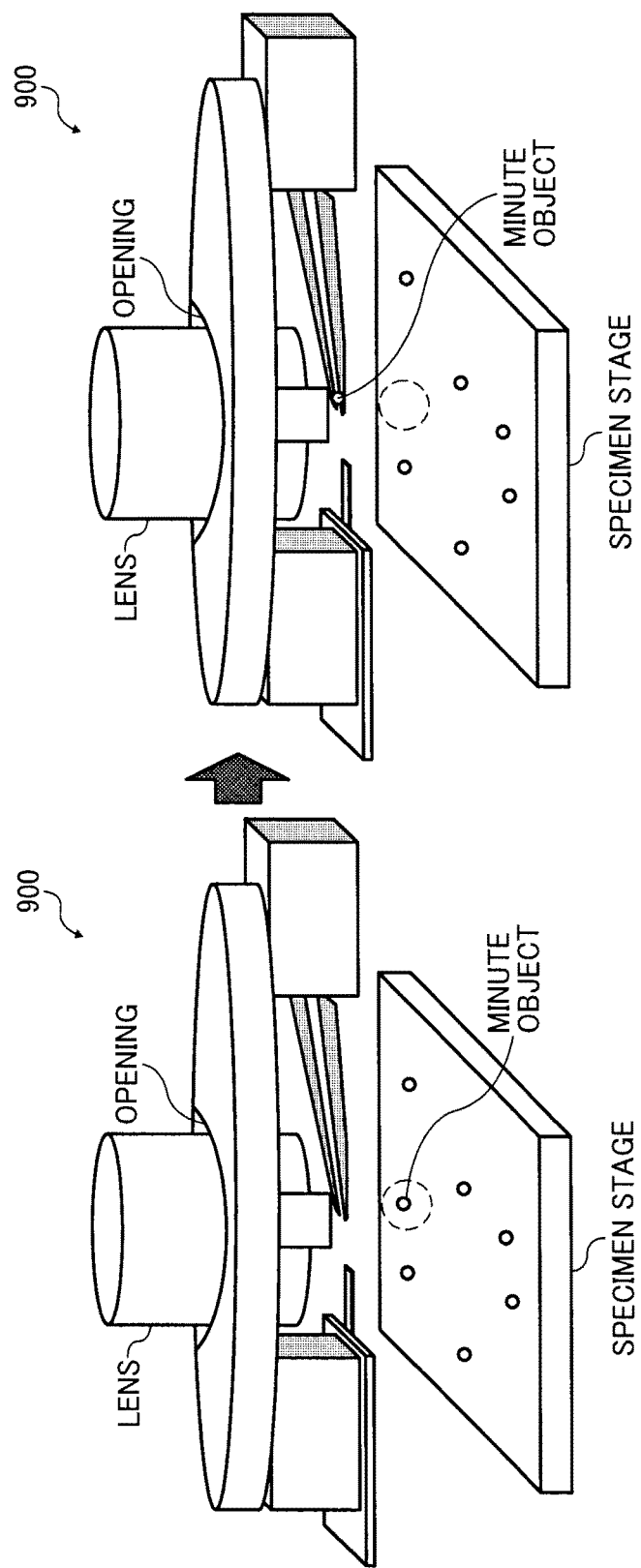

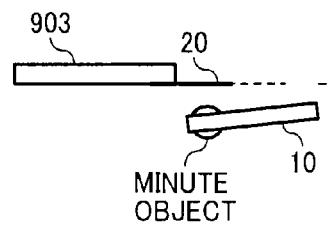 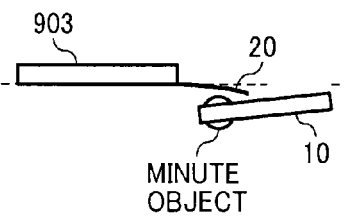 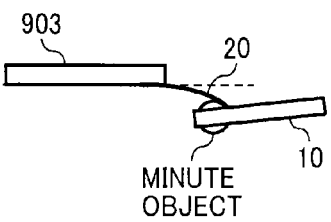
FIG. 28
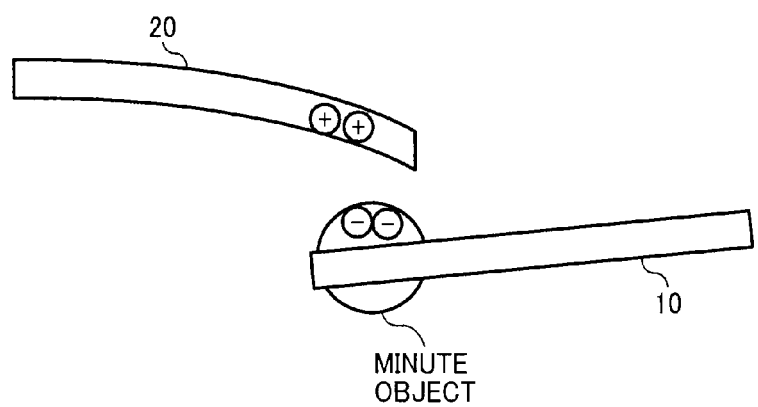
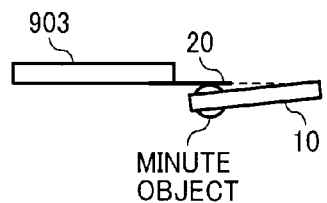 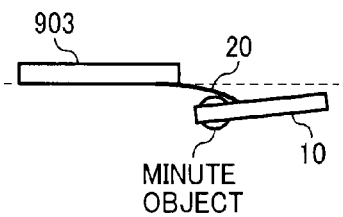 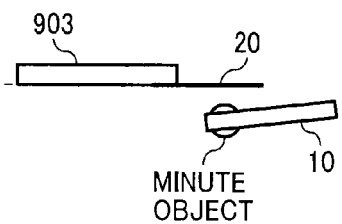

FIG. 32
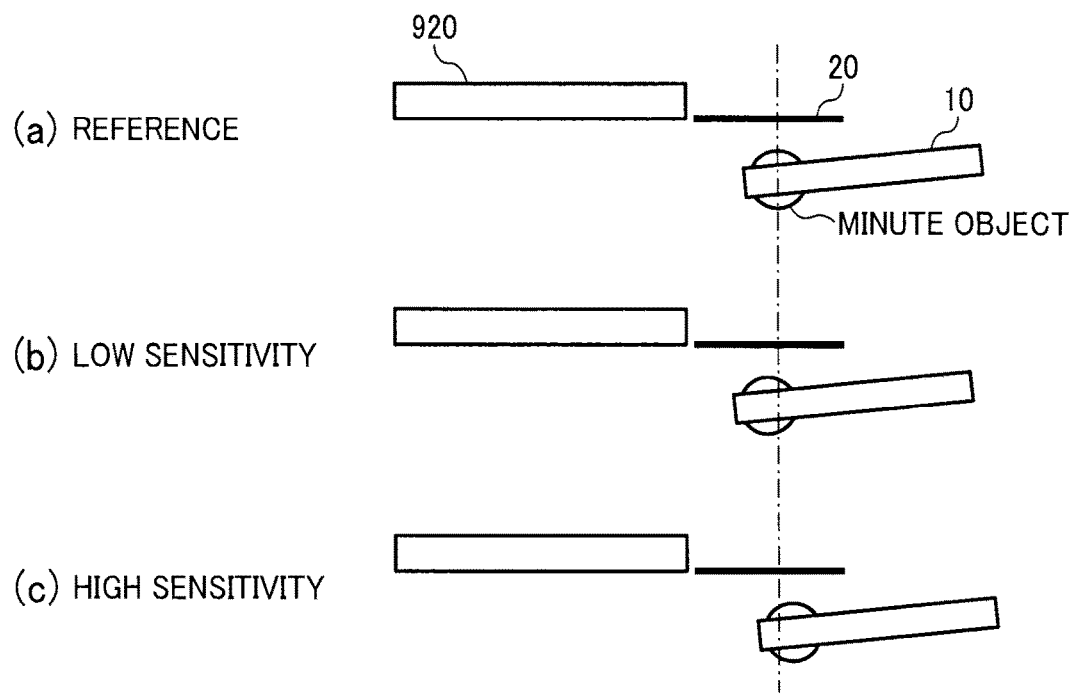
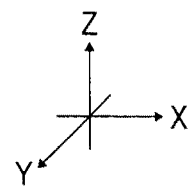

MINUTE OBJECT CHARACTERISTICS MEASURING APPARATUS

CROSS-REFERENCE TO RELATED APPLICATIONS

This patent application is based on and claims priority pursuant to 35 U.S.C. §119(a) to Japanese Patent Application Nos. 2014-263976, 2015-213591, and 2015-241945, filed on Dec. 26, 2014, Oct. 30, 2015, and Dec. 11, 2015 respectively, in the Japan Patent Office, the entire disclosure of each of which is hereby incorporated by reference herein.

BACKGROUND

Technical Field

The present disclosure relates to a minute object characteristics measuring apparatus for measuring characteristics of minute objects.

Description of the Related Art

Technologies for measuring characteristics (e.g. adhesive force, mirror force, charging polarity, electric resistivity, and dielectric constant) of minute objects have been actively developed recently.

SUMMARY

In accordance with some embodiments of the present invention, a minute object characteristics measuring apparatus is provided. The minute object characteristics measuring apparatus includes a holder, a cantilever, a measuring device, and a driver. The holder holds a minute object. The cantilever faces the minute object held by the holder. The measuring device measures a displacement of the cantilever. The driver drives one of the holder holding the minute object and the cantilever in a direction that the minute object held by the holder and the cantilever are brought close to or drawn away from each other.

In accordance with some embodiments of the present invention, another minute object characteristics measuring apparatus is provided. The minute object characteristics measuring apparatus includes a holder, a cantilever, a driver, a power source, and an ammeter. The holder holds a minute object and has conductivity. The cantilever faces the minute object held by the holder and has conductivity. The driver drives one of the holder holding the minute object and the cantilever in a direction that the minute object held by the holder and the cantilever are brought close to or drawn away from each other. The power source has polar opposites, and each of the polar opposites is independently connected to the holder or the cantilever. The ammeter measures a current flowed in the minute object when the holder and the cantilever are electrically continuous through the minute object.

In accordance with some embodiments of the present invention, another minute object characteristics measuring apparatus is provided. The minute object characteristics measuring apparatus includes a holder, a cantilever device, a measuring device, and a driver. The holder holds a minute object. The cantilever device integrally includes a plurality of cantilevers, and each of the cantilevers is capable of independently facing the minute object held by the holder. The measuring device measures a displacement of one of the cantilevers which is facing the minute object held by the holder. The driver moves one of the holder holding the minute object and the cantilever device to a position where the minute object held by the holder and the one of the cantilevers face with each other, and drives the one of the holder holding the minute object and the cantilever device in a direction that the minute object held by the holder and the one of the cantilevers are brought close to or drawn away from each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A to 5C are illustrations of a series operation for measuring mirror force of a minute object;

FIGS. 8A to 8C are illustrations of a series operation for measuring adhesive force of a minute object;

FIGS. 20A to 20C are illustrations of a series operation for measuring viscoelasticity of a minute object;

FIG. 26 is an illustration for explaining that collection of a minute object is difficult when the cantilever is present within the field of a microscope;

FIGS. 27A to 27C are illustrations of a series operation for measuring mirror force (the amount of charge) of a minute object;

FIG. 28 is an illustration for explaining the principle of measuring mirror force of a minute object;

FIGS. 29A to 29C are illustrations of a series operation for measuring adhesive force of a minute object;

FIG. 32 is an illustration for explaining how the accuracy of position control of a horizontal movement stage influences on the measurement accuracy;

Figure 1:
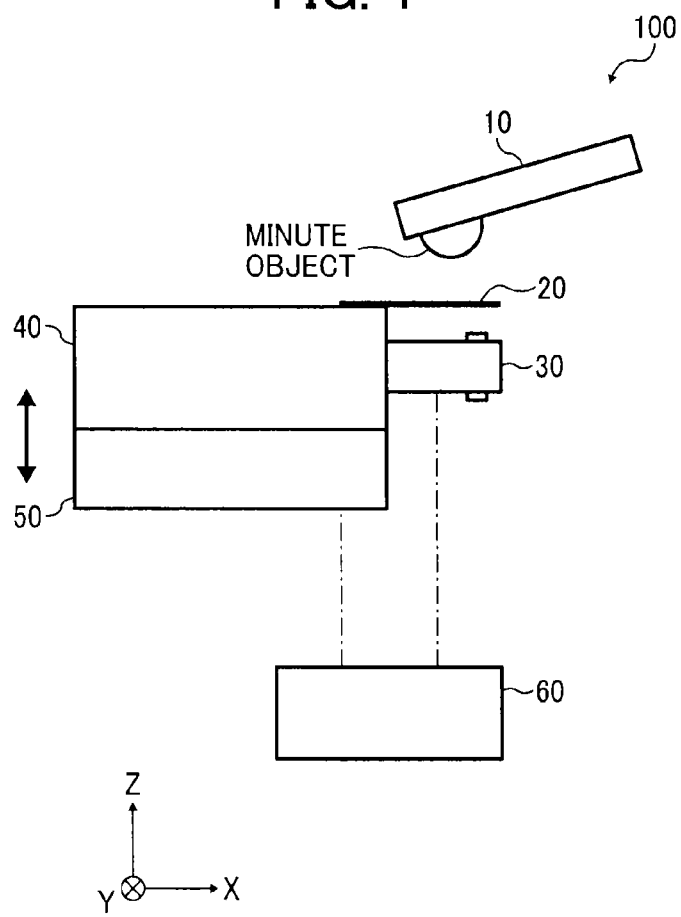
FIG. 1 is a schematic view of a minute object characteristics measuring apparatus according to the first embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

First Embodiment

A first embodiment of the present invention is described below with reference to FIGS. 1 to 9. FIG. 1 is a schematic view of a minute object characteristics measuring apparatus 100 according to the first embodiment of the present invention. Hereinafter, descriptions may be made with reference to the drawings that are drawn based on an XYZ three-dimensional rectangular coordinate system.

The minute object characteristics measuring apparatus 100 includes a holder 10 to hold a minute object, a cantilever 20, a laser displacement meter 30, a fixing jig 40, a micromotion stage 50, and a processor 60.

Figure 2:
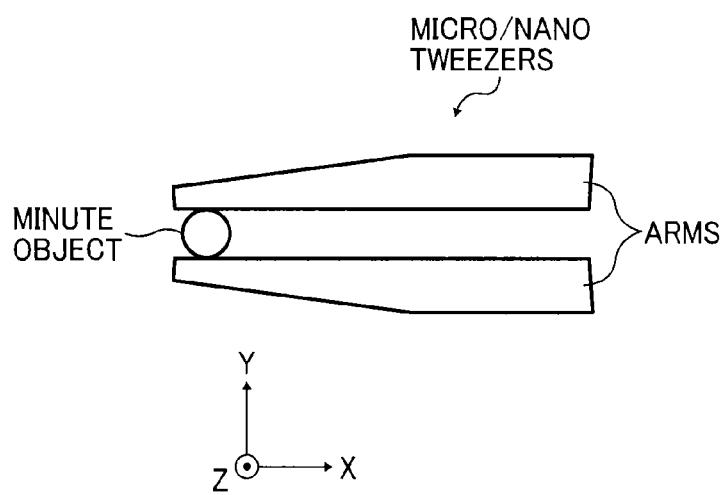
FIG. 2 is a schematic view of a micro/nano tweezers as an example of a holder according to some embodiments of the present invention.
Figure 3A:
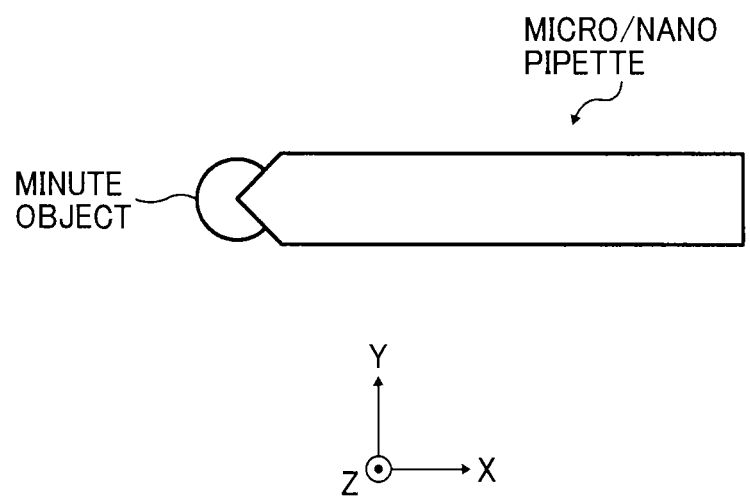
FIGS. 3A and 3B are schematic views of micro/nano pipettes as examples of the holder according to some embodiments of the present invention.
Figure 3B:
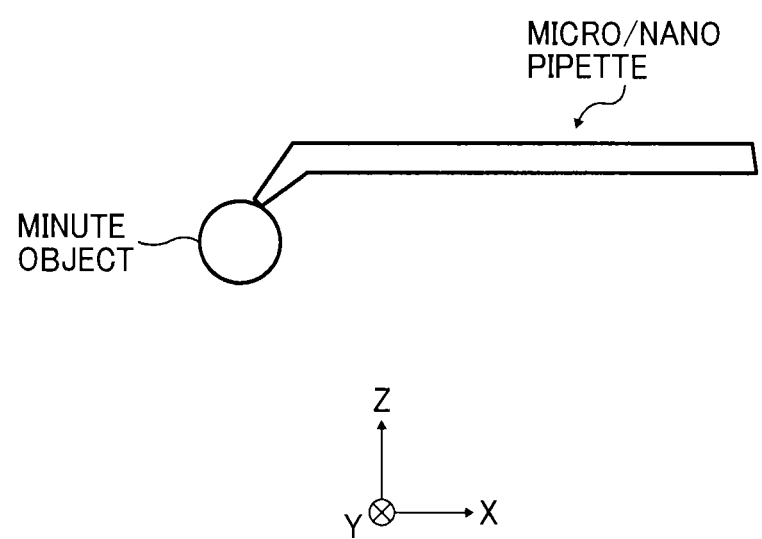

The holder 10 is capable of holding each particle of the minute object. The holder 10 may be a micro/nano gripper or micro/nano tweezers that holds a minute object by pinching it with both ends thereof, as illustrated in FIG. 2. The holder 10 may also be a micro/nano pipette that holds (adsorbs) a minute object by sucking it, as illustrated in FIGS. 3A and 3B.

Minute objects having a largest diameter in the range of 10 nm to 1 mm, preferably 1 to 100 μm, which can be held by the holder 10, are suitable as measuring objects. Specific examples of the minute object include, but are not limited to: powders used as constitutional materials of electrophotographic toners, pharmaceutical products, food products, and electronic devices; minute foreign substances attached to electronic substrates; and biological materials such as cells.

Specific examples of such powders include, but are not limited to, toner particles, constitutional materials for 3D printers (about several micrometers to several tens of micrometers), iron powders for charging toners (about 30 to 100 μm), and liquid crystal spacers (several nanometers).

Figure 4A:
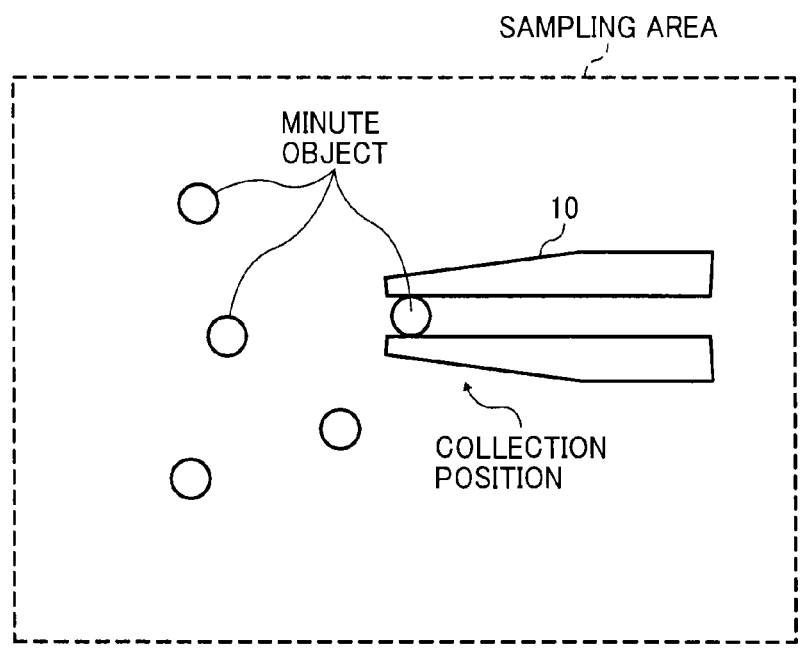
FIG. 4A is an illustration of a state in which the holder collects a minute object.
Figure 4B:
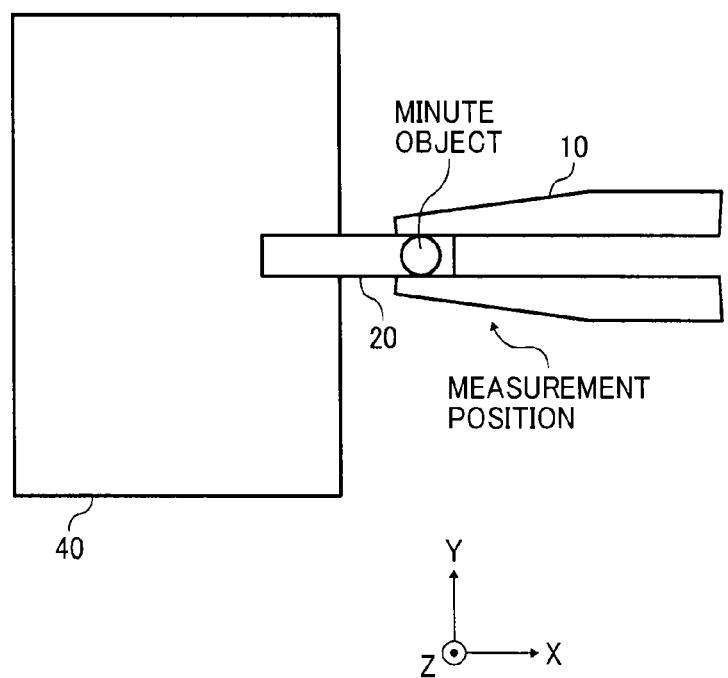
FIG. 4B is an illustration of a state in which the minute object held by the holder and a cantilever according to some embodiments of the present invention are facing each other.

According to the present embodiment, the holder 10 is movable between a collection position (see FIG. 4A) and a measurement position (see FIG. 4B) by an XYZ three-dimensional moving mechanism (hereinafter simply "three-dimensional moving mechanism") that causes the holder 10 to independently move in X-axis, Y-axis, and Z-axis directions. The collection position is disposed in a sampling area within which a group of minute objects is placed (e.g., a specimen stage on which minute objects are spread, a member on which minute objects are attached). The measurement position is a position where the minute object held by the holder 10 faces the cantilever 20. In FIG. 4B, the measurement position is disposed on the +Z side relative to the cantilever 20. When holding (collecting) the minute object, the holder 10 is manually operated through an operation unit. The XYZ three-dimensional moving mechanism may be replaced with another mechanism combining a tilt-rotating mechanism that causes the holder 10 to tilt-rotate and an XY two-dimensional moving mechanism that cases the holder 10 to move along the XY plane. The XYZ three-dimensional moving mechanism, tilt-rotating mechanism, and XY two-dimensional moving mechanism may be operated either automatically or manually.

According to the present embodiment, the fixing jig 40 is a member having upper and lower surfaces both in parallel with the XY plane and a side surface in parallel with the YZ plane (may be on the +X side), e.g., a member in the form of a rectangular parallelepiped, that is disposed on the micromotion stage 50.

According to the present embodiment, the cantilever 20 is a thin platy member. A fixed-end part thereof is fixed on the upper surface of the fixing jig 40, and an over-half free-end part thereof is hanging over the fixing jig 40 in the +X direction to face the minute object held by the holder 10 at the measurement position.

As the cantilever 20, a cantilever used for atomic force microscope (AFM), having a very high smoothness, can be used. A suitable cantilever with a proper spring constant and a proper material should be selected in accordance with the measurement details. Generally, the cantilever used for AFM has a chip for scanning a specimen on its free end. When used as the cantilever 20 according to the present embodiment, however, the cantilever needs not necessarily be equipped with the chip. Namely, either a chip-less cantilever or a cantilever having a chip can be used. In the latter case, the cantilever is so fixed that the chip faces toward the laser displacement meter 30 side, not the minute object side. Preferably, the smoothness of the cantilever 20 is as high as possible. Of course, any cantilever used for instruments other than AFM can be used as the cantilever 20.

The laser displacement meter 30 is fixed on the +X-side surface of the fixing jig 40 so as to face the cantilever 20. Since the laser displacement meter 30 is integrally combined with the cantilever 20 via the fixing jig 40, a displacement of the cantilever 20 caused by deformation (deflection) thereof can be measured with a high degree of accuracy.

The laser displacement meter 30 is not limited to a specific product. To make it possible to monitor deformation of the cantilever 20, the spot size of the laser displacement meter 30 is preferably equivalent to or smaller than the width of the cantilever 20. To make it possible to detect microdeformation of the cantilever 20, the measurement resolution of the laser displacement meter 30 is preferably as high as possible. In particular, the laser displacement meter 30 preferably has a measurement resolution of about 1 nm.

The micromotion stage 50 is micro-movable in the Z-axis direction. The micromotion stage 50 has a position resolution of nanometer order. In particular, a piezo stage (i.e., a stage having a piezo element as an actuator) is preferably used therefor. In addition, a stage having a high-accuracy high-resolution stepping motor or a solenoid as an actuator may also be used therefor.

In the present embodiment, a driver to micro-drive the cantilever 20 in the Z-axis direction includes the micromotion stage 50 and the fixing jig 40. According to another embodiment, the cantilever 20 is directly fixed to the micromotion stage 50, and the driver includes only the micromotion stage 50.

The driver is not limited in configuration so long as it is capable of micro-driving the cantilever 20 in the Z-axis direction.

The processor 60 controls the micromotion stage 50, acquires (collects) measurement results from the laser displacement meter 30, and determines characteristics of the minute object based on the measurement results.

Prior to the measurement, the holder 10 is positioned at the collection position in the sampling area, by operating the three-dimensional moving mechanism, if needed. The holder 10 is then manually operated to collect a minute object from the sampling area (see FIG. 4A), and moved to the measurement position where the minute object held by the holder 10 faces the cantilever 20 by operating the three-dimensional moving mechanism (see FIG. 4B).

Instead of moving the holder 10 by the function of the three-dimensional moving mechanism, the sampling area and the micromotion stage 50 may be given the two-dimensional moving function on the XY plane, and the holder 10 may be given the one-dimensional moving function in the Z-axis direction or the tilt-rotating function.

In position alignment when the holder 10 collects the minute object spread on or attached to the sampling area, or when the minute object is brought close to or into contact with the cantilever 20, a microscope is used for observing the minute object. The microscope is not limited in configuration so long as minute objects with a several-micrometer size are observable therewith. Such a microscope may be an optical microscope, an electron microscope, or an atomic force microscope.

A measurement procedure by the minute object characteristics measuring apparatus 100 is described below.

Measurement of Mirror Force

A method of measuring mirror force depending on the amount of charge of a minute object is described below with reference to FIGS. 5A to 5C and FIG. 6.

Figure 6:
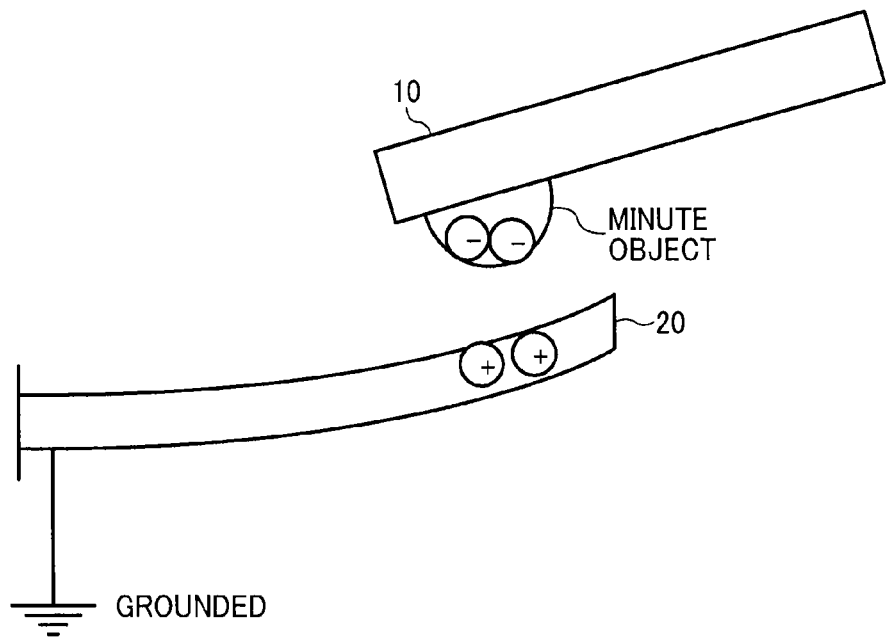
FIG. 6 is an illustration showing a charge distribution in a minute object held by the holder and the cantilever.

As a minute object held by the holder 10 is brought close to the cantilever 20, as illustrated in FIGS. 5A to 5C, mirror charges (inductive charges) having the opposite polarity and the equivalent quantity to the charges of the minute object are induced in the cantilever 20, as illustrated in FIG. 6. The mirror force acting between the minute object and the cantilever 20 is measured by the laser displacement meter 30 disposed on the back surface side (−Z side) of the cantilever 20.

More specifically, the three-dimensional moving mechanism causes the holder 10 holding the minute object positioned at the measurement position to move in the −Z direction so that the minute object and the cantilever 20 are brought close to each other, as illustrated in FIG. 5A. The processor 60 then micro-moves the micromotion stage 50 in the +Z direction so that the minute object and the cantilever 20 are brought much closer to each other, as illustrated in FIGS. 5B and 5C. The laser displacement meter 30 measures the amount of deflection (deformation) of the cantilever 20 and outputs a measurement value to the processor 60, for example, every several millimeters. Upon receipt of a processing start request through the operation unit, the processor 60 starts control of the micromotion stage 50 and acquisition of the measurement value from the laser displacement meter 30.

The processor 60 moves the micromotion stage 50 until the minute object and the cantilever 20 come into contact with each other. The processor 60 determines whether the minute object and the cantilever 20 have come into contact with each other based on the measurement value (i.e., the displacement of the cantilever 20 at the contact) from the laser displacement meter 30. The distance between the minute object and the cantilever 20 before the measurement starts, i.e., before the micromotion stage 50 starts moving, is properly set in accordance with the amount of charge held by the minute object. Preferably, the distance is approximately 1 to 100 μm.

When the moving speed of the micromotion stage 50 is too low, the cantilever 20 is exposed to laser light emitted from the laser displacement meter 30 too long a time, thereby causing a thermal drift and degrading the S/N (signal-to-noise ratio) of the measurement value. When the moving speed of the micromotion stage 50 is too high, the micromotion stage 50 cannot move following the set speed value. Thus, the moving speed of the micromotion stage 50 is preferably set in the range of 0.1 to 100 μm.

The specs of the cantilever 20 and the laser displacement meter 30 are determined in accordance with the amount of charge held by the minute object. Generally, a cantilever having a lower spring constant and a laser displacement meter having a higher resolution power are more preferred in measuring mirror force than in measuring adhesive force to be described later. Specifically, the cantilever 20 preferably has a spring constant of 0.05 N/m or less, more preferably 0.01 N/m or less. The laser displacement meter 30 preferably has a resolution power of 10 nm or less, more preferably 1 nm or less. The cantilever 20 has a conductive surface and is grounded.

The mirror force measured by the above procedure can be converted into the amount of charge. Specifically, the amount of charge of the minute object can be measured by a method described in Reference 3 (Yoshinori Nishitani, Hiroaki Muramatu, Hiroyuki Maruyama, Ken-ichiro Tanoue, Shuji Matsusaka, Masuda Hiroaki (Kyoto University Graduate School of Engineering), "Measurement of Interaction Force between Particles and Wall Surfaces in Gas Phase by AFM", Collection of Papers for The Summer Symposium of The Society of Powder Technology, Japan (2000), pp. 67-69).

Figure 7:
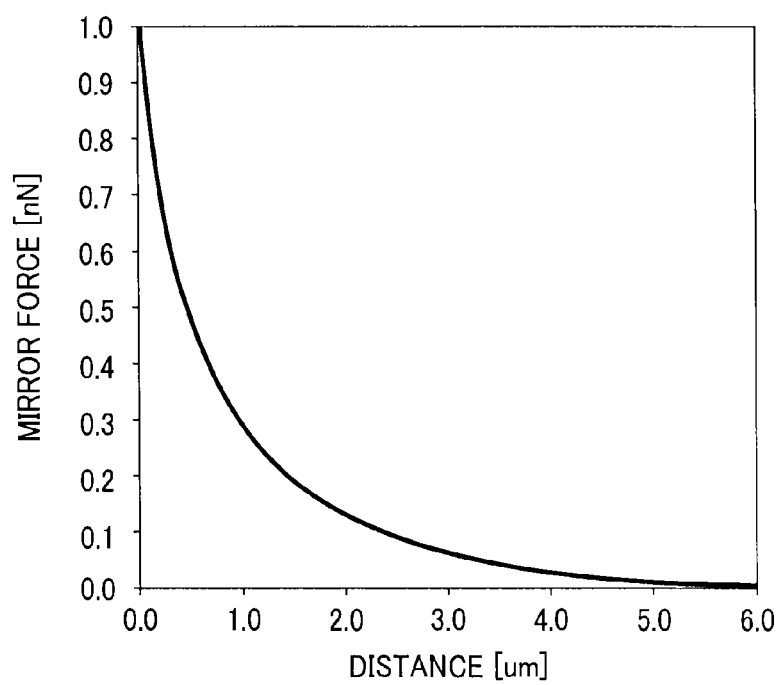
FIG. 7 is a graph showing a relation between the distance of a minute object held by the holder to the cantilever and the mirror force of the minute object.

FIG. 7 is a graph showing the mirror force of a minute object measured under the following conditions.

Cantilever: A silicone nitride cantilever BL-RC150VB (having a spring constant of 0.006 N/M, coated with gold) available from Olympus Corporation.

Holder: A pair of nano tweezers equipped with a contact sensor available from Aoi Electronics Co., Ltd.

Displacement meter: A spectral-interference laser displacement meter ST-F01 and a controller SI-F1000 available from Keyence Corporation.

Minute object: Model toner particles spread on a silicon substrate. One randomly-selected particle is subjected to the measurement. (The amount of charge Q/M measured by a blow method is −33.2 μC/g.)

Micromotion stage: A Z-axis compact stage 100 μm P-621.ZCD and a digital controller E-753.1CD available from PI-Japan Co., Ltd.

Moving condition: The micromotion stage (piezo stage) is moved at a speed of 10 μm/sec while keeping the distance between the toner particle and the cantilever about 9 μm. The laser displacement meter starts collecting measurement values when the micromotion stage (piezo stage) has moved 1 μm.

FIG. 7 shows a result of the above measurement. This result indicates that as the distance between the minute object and the cantilever decreases, the mirror force increases. A further analysis of the result indicates that the mirror force increases in inverse proportion to the square of the distance. It is confirmed that the mirror force can be reliably measured under the above-described conditions. The amount of charge of the minute object can be calculated from the mirror force shown in FIG. 7 according to a known method. As an example, the amount of charge of the minute object calculated from the mirror force shown in FIG. 7 according to the method described in the above-cited reference is 0.96 [fc] in absolute value.

Determination of Charging Polarity

A method of determining the charging polarity of a minute object is described below. Similar to the procedure in measuring mirror force, the three-dimensional moving mechanism causes the holder 10 holding the minute object positioned at the measurement position to move in the −Z direction so that the minute object and the cantilever 20 are brought close to each other. The processor 60 then micro-moves the micromotion stage 50 in the +Z direction so that the minute object and the cantilever 20 are brought much closer to each other. A charger is put into operation to apply a voltage to (i.e., to charge) the cantilever 20. The processor 60 applies a positive voltage (i.e., gives positive charges) to the cantilever 20. When the cantilever 20 deforms so as to be attracted to the minute object, the minute object is determined to be negatively charged. When the cantilever 20 deforms so as to be repelled from the minute object, the minute object is determined to be positively charged. Upon receipt of a processing start request through the operation unit, the processor 60 starts control of the micromotion stage 50 and acquisition of the measurement value from the laser displacement meter 30.

The determination can be made in a similar manner when the processor 60 applies a negative voltage (i.e., gives negative charges) to the cantilever 20. When the cantilever 20 deforms so as to be attracted to the minute object, the minute object is determined to be positively charged. When the cantilever 20 deforms so as to be repelled from the minute object, the minute object is determined to be negatively charged. Preferably, the distance between the cantilever 20 and the minute object is set to 1 to 5 μm. The voltage applied to the cantilever 20 is determined depending on the amount of charge of the minute object. Preferably, the applied voltage is in the range of 0.1 to 3 V in absolute value.

Measurement of Adhesive Force

A method of measuring adhesive force of a minute object is described below with reference to FIGS. 8A to 8C. Similar to the procedure in measuring mirror force, the three-dimensional moving mechanism causes the holder 10 holding the minute object positioned at the measurement position to move in the −Z direction so that the minute object and the cantilever 20 are brought close to each other, as illustrated in FIG. 8A. The processor 60 then micro-moves the micromotion stage 50 in the +Z direction so that the minute object and the cantilever 20 are brought into contact with each other, as illustrated in FIG. 8B. Upon receipt of a processing start request through the operation unit, the processor 60 starts control of the micromotion stage 50 and acquisition of the measurement value from the laser displacement meter 30.

Whether the minute object and the cantilever 20 have come into contact with each other is determined based on the measurement value (i.e., the displacement of the cantilever 20 at the contact) from the laser displacement meter 30. The amount of deformation of the cantilever 20 at contacting the minute object is preferably about 1 μm or less, depending on the spring constant of the cantilever 20.

The processor 60 then micro-moves the micromotion stage 50 in a direction that the minute object and the cantilever 20 are drawn away from each other (i.e., in the −Z direction). Immediately after this movement of the micromotion stage 50, the minute object and the cantilever 20 remain in contact with each other due to the adhesive force acting therebetween. However, after a continuous movement of the micromotion stage 50, the force generated by deflection of the cantilever 20 exceeds the adhesive force between the minute object and the cantilever 20, thereby separating the minute object and the cantilever 20 from each other, as illustrated in FIG. 8C.

Thus, the processor 60 can determine the adhesive force between the minute object and the cantilever 20 by acquiring the force acting on the cantilever 20 at the time that the minute object and the cantilever 20 are separated from each other. Since the measurement value from the laser displacement meter 30 (i.e., the amount of deformation of the cantilever 20) becomes maximum at the time that the minute object and the cantilever 20 are separated from each other, the processor 60 only has to acquire the maximum measurement value of the laser displacement meter 30. The adhesive force of the minute object can be determined from the maximum value and the spring constant of the cantilever 20.

When the moving speed of the micromotion stage 50 is too low, the cantilever 20 causes a drift and degrades the S/N (signal-to-noise ratio) of the measurement value. When the moving speed of the micromotion stage 50 is too high, the micromotion stage 50 cannot move following the set speed value. Thus, the moving speed of the micromotion stage 50 is preferably set in the range of 0.1 to 100 µm. The specs of the cantilever 20 and the laser displacement meter 30 are determined in accordance with the adhesive force of the minute object. Preferably, the cantilever 20 has a spring constant in the range of 0.01 to 1 N/m, and the laser displacement meter 30 has a resolution power of 100 nm or less.

In particular, the adhesive force is generated between the surface material of the cantilever 20 and the minute object. For the purpose of relative comparison of the adhesive force between the minute object held by the holder 10 and the cantilever 20, it is not necessary to limit the surface material of the cantilever 20. On the other hand, in the case where the minute object is a material which is likely to easily charge the cantilever 20, it is preferable that at least the surface of the cantilever 20 contains a conductive material and the cantilever 20 is grounded. In the case of evaluating a minute object including a material which may contaminate the surface of the cantilever 20 after repeated measurement, it is preferable that the surface of the cantilever 20 is coated with a highly-releasable material.

Figure 9:
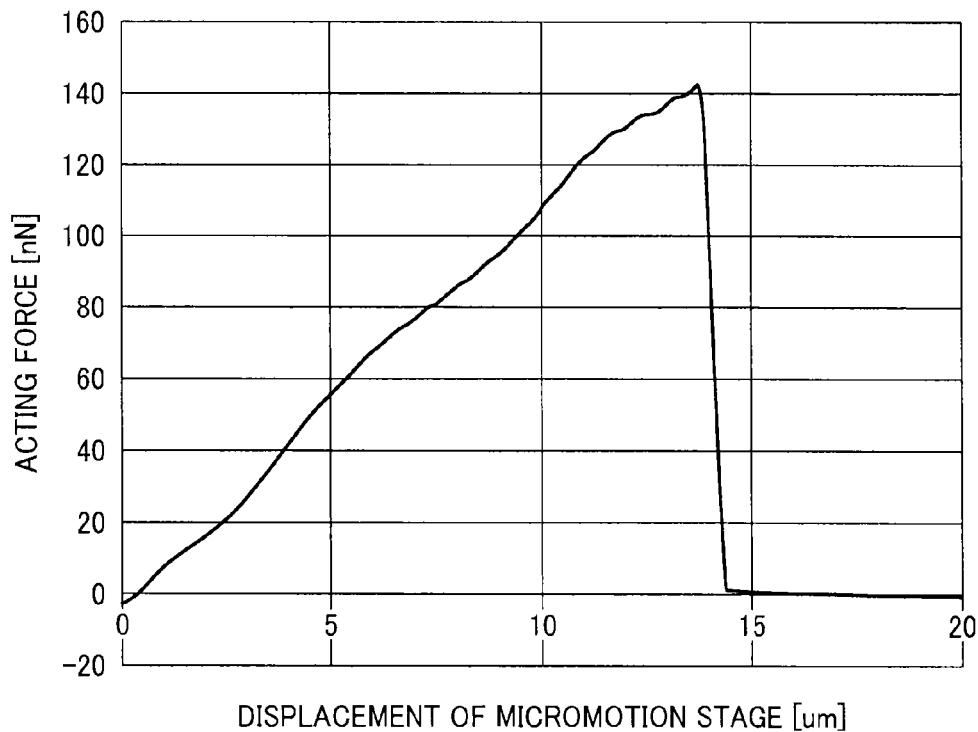
FIG. 9 is a graph showing a relation between the displacement of a micromotion stage and the acting force of the cantilever.

FIG. 9 is a graph showing the adhesive force of a minute object measured under the following conditions.

Cantilever: A silicone nitride cantilever OMCL-TR400PB (having a spring constant of 0.02 N/M, coated with gold) available from Olympus Corporation.

Holder: A pair of nano tweezers equipped with a contact sensor available from Aoi Electronics Co., Ltd.

Displacement meter: A spectral-interference laser displacement meter SI-F01 and a controller SI-F1000 available from Keyence Corporation.

Minute object: Model toner particles (without external additive, having an average particle diameter of 6 µm) spread on a silicon substrate. One randomly-selected particle is subjected to the measurement.

Micromotion stage: A Z-axis compact stage 100 µm P-621.ZCD and a digital controller E-753.1CD available from PI-Japan Co., Ltd.

Moving condition: The micromotion stage (piezo stage) is moved 20 µm at a speed of 10 µm/sec after the toner particle and the cantilever have come into contact with each other. The laser displacement meter starts collecting measurement values when the micromotion stage (piezo stage) has moved 0.1 µm.

FIG. 9 shows a result of the above measurement. As the micromotion stage 50 is micro-moved in the direction that the minute object and the cantilever 20, having been in contact with each other, are drawn away from each other (i.e., in the −Z direction), the cantilever 20 deforms (i.e., the acting force shown in FIG. 9 increases). As the micromotion stage 50 is further micro-moved in the −Z direction, the minute object and the cantilever 20 are separated from each other (when the displacement of the micromotion stage is 14 µm as shown in FIG. 9). The acting force of the cantilever 20 at the time that the minute object and the cantilever 20 are separated from each other, i.e., 140 nN, is the adhesive force between the minute object and the cantilever 20. According to the above-described measurement conditions, the surface material of the cantilever 20 is gold. Therefore, the measured adhesive force is that generated between the minute object and the gold.

According to the first embodiment of the present invention, the minute object characteristics measuring apparatus 100 includes: the holder 10 to hold a minute object; the cantilever 20 to face the minute object held by the holder 10; the laser displacement meter 30 to measure a displacement of the cantilever 20; and the driver including the micromotion stage 50 to drive the cantilever 20 in a direction that the minute object held by the holder 10 and the cantilever 20 are brought close to or drawn away from each other.

According to this embodiment, various characteristics of the minute object can be accurately measured by measuring a displacement of the cantilever 20 caused by a force between the minute object held by the holder 10 and the cantilever 20 facing the minute object generated owing to a micro-movement of the micromotion stage 50.

Thus, according to this embodiment, measurement accuracy is improved.

A related-art method of measuring characteristics of a minute object by fixing (e.g., adhesively bonding) the minute object to a cantilever of an atomic force microscope is known. This method is not practical because a very long period of time is required to fix the minute object to the cantilever.

The holder 10 of the minute object characteristics measuring apparatus 100 is capable of holding each particle of the group of minute objects. Therefore, it is possible to extract (sample) a small amount of minute objects assumed to have abnormal shape, size, color, etc., and measure inherent characteristics of such minute objects. Thus, it is possible to evaluate characteristics of the group of minutes object in a short period of time.

The minute object characteristics measuring apparatus 100 further includes the processor 60 to control the driver including the micromotion stage 50 and to determine characteristics of the minute object based on the measurement result from the laser displacement meter 30. Thus, the minute object characteristics measuring apparatus 100 can automatically measure characteristics of the minute object.

The cantilever 20 is conductive and grounded. The processor 60 determines the mirror force of the minute object based on the amount of deformation (deflection) of the cantilever 20 at the time that the minute object held by the holder 10 and the cantilever 20 are brought close to each other.

Thus, it is possible to automatically measure the mirror force of the minute object with a high degree of accuracy.

The processor 60 determines the adhesive force of the minute object based on the amount of deformation (deflection) of the cantilever 20 at the time that the minute object held by the holder 10 and the cantilever 20, having been in contact with each other, are separated from each other.

Thus, it is possible to automatically measure the adhesive force of the minute object with a high degree of accuracy.

Since the cantilever 20 is conductive and grounded, even when the minute object and the cantilever 20 are repeatedly brought into contact with each other in the measurement of adhesive force, the minute object and the cantilever 20 are suppressed from accumulating charges therein. As a result, during the measurement of adhesive force of the minute object, the mirror force thereof becomes approximately zero. Thus, the adhesive force can be measured with a much higher degree of accuracy.

In the measurement of adhesive force, in place of or in addition to the cantilever 20 being conductive and grounded, the holder 10 may also be conductive and grounded. In this case, similarly, during the measurement of adhesive force of the minute object, the mirror force thereof becomes approximately zero. Thus, the adhesive force can be measured with a much higher degree of accuracy.

The minute object characteristics measuring apparatus 100 further includes the charger to positively or negatively charge the cantilever 20. The processor 60 determines the charging polarity of the minute object based on the direction of deformation (deflection) of the cantilever 20 at the time that the minute object held by the holder 10 and the cantilever 20 are brought close to each other.

Thus, it is possible to automatically measure (determine) the charging polarity of the minute object with a high degree of accuracy.

Since the displacement of the cantilever 20 is measured by the laser displacement meter 30, it is possible to measure the actual distance of displacement and to make the apparatus more compact.

On the other hand, when the displacement of the cantilever 20 is measured by an optical lever method, the distance of displacement should be calculated from multiple detection signals and it is difficult to make the apparatus compact.

Since the driver including the micromotion stage 50 is capable of integrally driving the cantilever 20 and the laser displacement meter 30 in the direction that they are brought close to or drawn away from each other, the displacement of the cantilever 20 caused by a deformation (deflection) thereof can be measured with a high degree of accuracy.

Being placed on the micromotion stage 50, which is rigid, by the fixing jig 40, the cantilever 20 and the laser displacement meter 30 are capable of smoothly micro-moving with insulated from the influence of noise such as vibration. Thus, the displacement of the cantilever 20 caused by a deformation thereof can be measured with a high degree of accuracy.

By synchronizing the drive of the driver (i.e., the motion of the micromotion stage 50) with the measurement by the laser displacement meter 30, the mirror force, adhesive force, and charging polarity of the minute object can be measured in a short period of time, thereby reducing the influence of a drift of the cantilever 20.

The minute object characteristics measuring apparatus 100 includes the three-dimensional moving mechanism to move the holder 10 holding the minute object to the measurement position where the minute object and the cantilever 20 face with each other, after the minute object is held (collected) by the holder 10 at the collection position where the minute object and the cantilever 20 do not face with each other.

Thus, it is possible to evaluate characteristics of the minutes object in a short period of time since the minute object can smoothly transit from the collection process to the characteristics measurement process.

According to the present embodiment, the cantilever 20 employs a cantilever for use in an atomic force microscope.

Thus, the surface of the cantilever 20 has a high smoothness, and the contact area between the minute object and the cantilever 20 is suppressed from varying in each measurement. In optically measuring the amount of deformation of the cantilever 20, light directed on the cantilever 20 keeps going straight without scattering. Thus, measurement accuracy can be improved by detecting such a light going straight without scattering.

In the case where the holder 10 has a pair of arms capable of gripping a minute object, one randomly-selected minute object (particle) can be reliably collected.

In the case where the holder 10 is capable of adsorbing a minute object, one randomly-selected minute object (particle) can be collected while less loading the minute object.

Second Embodiment

A second embodiment of the present invention is described below with reference to FIG. 10.

Measurement of Electric Resistance

Figure 10:
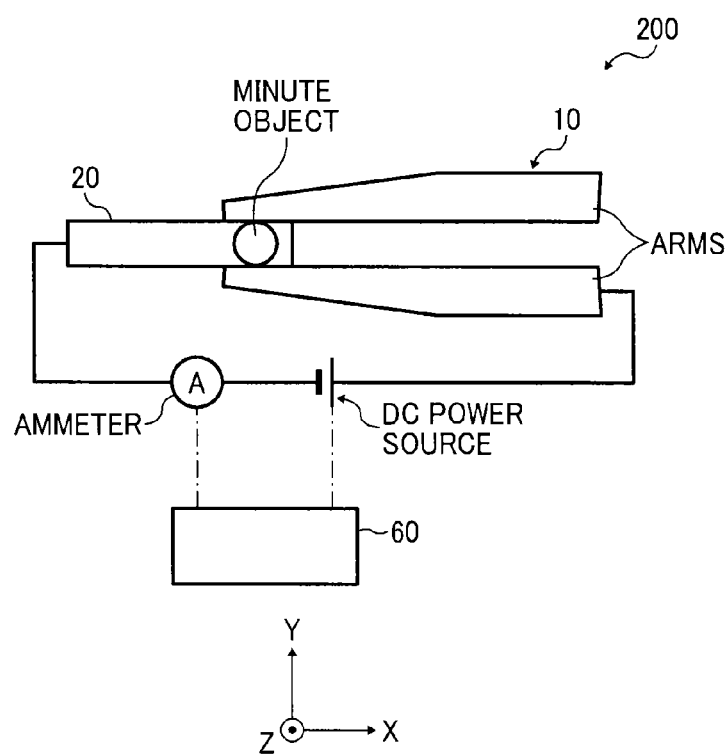
FIG. 10 is a schematic view of a minute object characteristics measuring apparatus according to the second embodiment of the present invention.

FIG. 10 is a schematic view of a minute object characteristics measuring apparatus 200 according to the second embodiment of the present invention, which measures electric resistivity of a minute object. In FIG. 10, the micromotion stage 50, the fixing jig 40, and the laser displacement meter 30 are omitted.

The minute object characteristics measuring apparatus 200 includes: the holder 10 having conductivity; the cantilever 20 having conductivity; a direct-current power source having polar opposites, each of which is independently connected to the holder 10 or the cantilever 20, to apply a direct current to the minute object; and an ammeter to measure a current flowed in the minute object when the holder 10 and the cantilever 20 are electrically continuous through the minute object. The holder 10, the cantilever 20, the direct-current powder source, and the ammeter form a series circuit. In the minute object characteristics measuring apparatus 200, the holder 10 and the cantilever 20, each having conductivity, are serving as electrodes.

According to another embodiment, a standard resistance may be inserted into the circuit to measure a voltage drop in the standard resistance with a voltmeter. According to another embodiment, a lock-in amplifier that extracts a specific-frequency component may be provided to apply an alternating current voltage and measure a current.

In FIG. 10, the holder 10 is connected to a high terminal (positive pole) of the power source, and the cantilever 20 is connected to a low terminal (negative pole) of the power source. Alternatively, the holder 10 and the cantilever 20 may be connected vice versa.

Being served as an electrode, the holder 10 is required to be electrically continuous (i.e., conductive) at least from the contact surface with the minute object to the connection part with the power source. Preferably, the electrical continuity of the holder 10 is ⅒ or less of the resistance value of the minute object. In case a holder having no electrical continuity (i.e., conductivity) under normal conditions is employed, electrical continuity (i.e., conductivity) should be secured by forming a film on the surface of the holder with gold, copper, tungsten, etc., or by preparing a micro-electrode by means of deposition function such as focused ion beam.

Similar to the procedure in measuring mirror force, the three-dimensional moving mechanism causes the holder 10 holding the minute object positioned at the measurement position to move in the −Z direction so that the minute object and the cantilever 20 are brought close to each other. The processor 60 then micro-moves the micromotion stage 50 in the +Z direction so that the minute object and the cantilever 20 are brought into contact with each other. Thus, a circuit is promptly configured that gives electrical continuity to the holder 10 and the cantilever 20 through the minute object. The processor 60 determines whether the minute object and the cantilever 20 have come into contact with each other based on the measurement value (i.e., the amount of deformation of the cantilever 20 at the contact) from the laser displacement meter 30. The amount of deformation of the cantilever 20 at contacting the minute object is preferably about 1 µm or less, depending on the spring constant of the cantilever 20. Upon receipt of a processing start request through the operation unit, the processor 60 starts control of the micromotion stage 50 and acquisition of the measurement value from the laser displacement meter 30.

The contact condition (i.e., contact pressure) between the minute object and the electrodes can be accurately managed when one of the electrodes employs a cantilever. The reasons for the accurate management of the contact condition are considered as follows. The first reason is that the pressure applied to the minute object can be managed by measuring the amount of deformation of the cantilever 20 by the laser displacement meter 30. As an example, when the cantilever 20 has a spring constant of 0.01 N/m and the laser displacement meter 30 has a resolution power of 10 nm, the pressure applied to the minute object can be controlled in the 0.1-µN unit. The second reason is that the surface of the cantilever 20 has a high smoothness. Thus, a variation in the contact area of the cantilever 20 with the minute object, which may be caused in each measurement due to the surface roughness of the cantilever 20, can be minimized.

Figure 11:
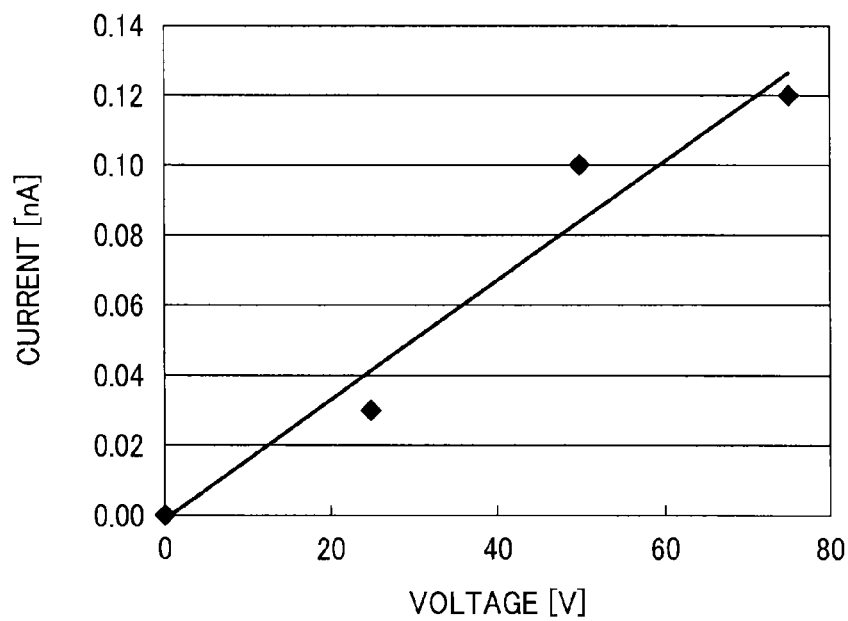
FIG. 11 is a graph showing a relation between the voltage applied to a minute object and the current flowed in the minute object when the holder and the cantilever are electrically continuous through the minute object.

After the holder 10 and the cantilever 20 are given electrical continuity through the minute object, the processor 60 applies a voltage to the minute object with the direct-current power source, reads a current value flowed in the minute object with the ammeter, and determines the electrical resistance by the Ohm's law, as shown in FIG. 11.

The upper limit of the voltage applied to the minute object is preferably about 100 V, for the purpose of avoiding the occurrence of electric discharge between the electrodes. It is preferable to start reading of the current value about one minute after the application of a voltage, for the purpose of avoiding the influence of input inrush current. To obtain a measurement result with a high degree of accuracy, it is preferable to vary the applied voltage value within each measurement, read a variation caused in the current value, and obtain a resistance value by linear regression based on the Ohm's law.

FIG. 11 is a graph showing electric resistance (voltage/current) measured under the following conditions.

Cantilever: A silicone nitride cantilever BL-RC150VB (having a spring constant of 0.006 N/M, coated with gold) available from Olympus Corporation.

Holder: A pair of nano tweezers available from Aoi Electronics Co., Ltd.

Displacement meter: A spectral-interference laser displacement meter SI-F01 and a controller SI-F1000 available from Keyence Corporation.

Constant-voltage power source: A digital voltage generator available from Matsusada Presision Inc.

Ammeter: An ammeter available from TFF Corporation Keithley Instruments.

Minute object: A glass bead (having an average particle diameter of 5 µm) available from Potters-Ballotini Co., Ltd. The glass bead is spread on a silicon substrate. One randomly-selected particle is subjected to the measurement.

Micromotion stage: A Z-axis compact stage 100 µm P-621.ZCD and a digital controller E-753.1CD available from PI-Japan Co., Ltd.

Voltage applying condition: 0 V, 25 V, 50 V, and 75 V.

Current measuring condition: Obtain a current value one minute after the voltage application.

Pressure condition applied to minute object: 0.6 nN.

FIG. 11 shows a result of the above measurement. FIG. 11 indicates that the measured current values linearly vary in accordance with the voltage variation. The straight line shown in FIG. 11 is the linear regression result of the measured results based on the Ohm's law. The slope of the straight line determines that the resistance value of the glass bead, serving as the minute object, is 581 [GΩ].

Measurement of Dielectric Constant

The minute object characteristics measuring apparatus 200 also measures dielectric constant of a minute object by replacing the direct-current power source with an alternating-current power source. The alternating-current power source can measure frequency response of the current flowed in the minute object, and impedance can be determined thereby. Further, by determining capacitor from the impedance, dielectric constant can be obtained.

Figure 12:
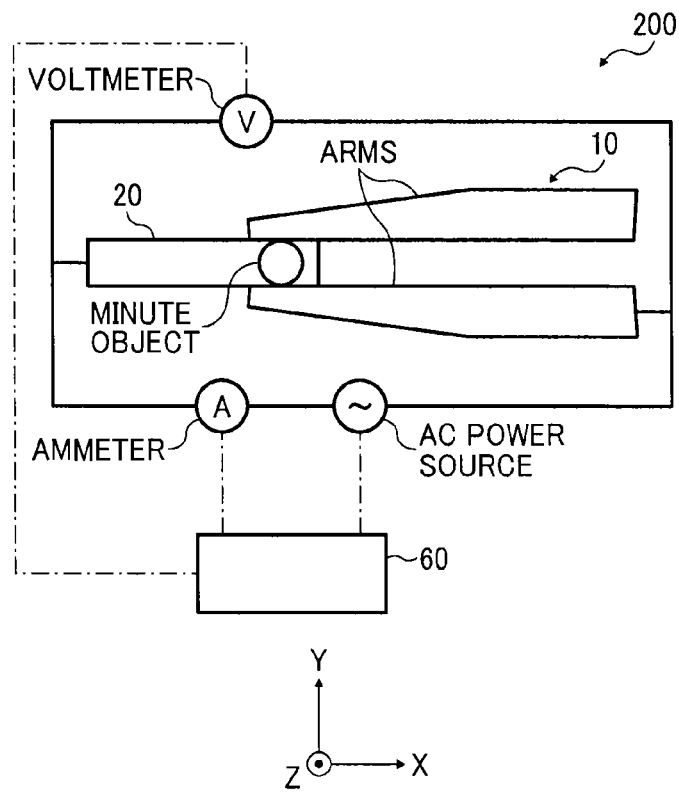
FIG. 12 is a schematic view of another minute object characteristics measuring apparatus according to the second embodiment of the present invention.

FIG. 12 is a schematic view of the minute object characteristics measuring apparatus 200 which measures dielectric constant of a minute object. In FIG. 12, the micromotion stage 50, the fixing jig 40, and the laser displacement meter 30 are omitted. The configuration of FIG. 12 is different from that of FIG. 10 in that the direct-current power source is replaced with the alternating-current power source and the holder 10 and the cantilever 20 are connected through a voltmeter. By applying an alternating current voltage to the minute object and measuring a current flowed in and a voltage generated in the minute object, impedance can be measured. The configuration illustrated in FIG. 12 can also measure electrical resistance in addition to dielectric constant.

According to the second embodiment of the present invention, the minute object characteristics measuring apparatus 200 includes: the holder 10 having conductivity to hold a minute object; the cantilever 20 having conductivity to face the minute object held by the holder 10; the driver including the micromotion stage 50 to drive the cantilever 20 in a direction that the minute object held by the holder 10 and the cantilever 20 are brought close to or drawn away from each other; a power source having polar opposites, each of which is independently connected to the holder 10 or the cantilever 20; and an ammeter to measure a current flowed in the minute object when the holder 10 and the cantilever 20 are electrically continuous through the minute object.

According to this embodiment, electric characteristics of the minute object can be measured by measuring a current flowed in the minute object by bringing the minute object held by the holder 10 and the cantilever 20 facing the minute object into contact with each other by micro-moving the micromotion stage 50.

Thus, the minute object held by the holder 10 and the cantilever 20 are securely brought into contact with each other owing to the elastic force of the cantilever 20.

Thus, according to this embodiment, measurement accuracy is improved.

Since the minute object characteristics measuring apparatus 200 further includes the laser displacement meter 30 to measure the displacement of the cantilever 20, the contact condition (i.e., contact pressure) between the minute object and the cantilever 20 can be accurately managed.

The minute object characteristics measuring apparatus 200 further includes the processor 60 to determine characteristics of the minute object based on the measurement results from the ammeter when the minute object held by the holder 10 and the cantilever 20 are in contact with each other.

Thus, it is possible to automatically measure the electric characteristics of the minute object with a high degree of accuracy.

When the power source is the direct-current power source, the targeted characteristics of the minute object to be measured is electric resistance. In this case, the minute object characteristics measuring apparatus 200 can easily, rapidly, and accurately measure the electric resistance.

When the power source is the alternating-current power source, the minute object characteristics measuring apparatus 200 further includes the voltmeter to measure a voltage applied to the minute object when the holder 10 and the cantilever 20 are electrically continuous through the minute object, and the targeted characteristics of the minute object to be measured is at least one of dielectric constant and electric resistance. In this case, the minute object characteristics measuring apparatus 200 can easily, rapidly, and accurately measure at least one of the dielectric constant and electric resistance.

Since only one particle of the minute object is subjected to the measurement while being pinched with the holder 10 and the cantilever 20, electric characteristics (e.g., electric resistance and dielectric constant) inherent to the particle can be reliably measured with a high degree of accuracy.

In case a minute object group including multiple particles is subjected to the measurement of electric characteristics while being pinched with an electrode pair, the contact condition between the minute object group and the electrode pair fluctuates due to the fluidity of the minute object. In this case, the measurement is not reliable and accurate. The measurement accuracy is influenced by the filling rate, packed condition, etc., of the minute object group.

According to the present embodiment, the minute object characteristics measuring apparatus 200 includes the laser displacement meter 30. According to another embodiment, the minute object characteristics measuring apparatus 200 does not include the laser displacement meter 30. In this case, bringing the minute object and the cantilever 20 into contact with each other should be performed under a visual observation with a microscope. However, there is no problem in terms of measurement of electric characteristics (e.g., electric resistance and dielectric constant) of the minute object.

In the case where the holder 10 has a pair of arms capable of gripping a minute object, each arm may become electrically continuous with the cantilever 20 through the minute object. Alternatively, one of the arms may become electrically continuous with the cantilever 20 through the minute object, while the other may not, as is the case with FIGS. 10 and 12. In such a case, the amount of current leaks to the arm which is not used for the measurement of electric resistance of the minute object can be reduced, improving measurement accuracy.

When quality evaluation or mechanism analysis is carried out by researchers and/or engineers, evaluating only one characteristics of a minute object is insufficient in most cases. On the other hand, introducing multiple instruments in accordance with the analysis detail is very costly in terms of installation and maintenance. If a single minute object is to be subjected to multiple measurements of characteristics, the single minute object, being very small in size, should be transferred among the multiple instruments. Thus, a high degree of positioning technology is required and the time for evaluation is elongated.

The minute object characteristics measuring apparatuses according to the first and second embodiments of the present invention are capable of measuring multiple characteristics (e.g., adhesive force, mirror force, charging polarity, electric resistance, and dielectric constant) by properly modifying the configuration. In each of the first and second embodiments, a single cantilever is used for measuring multiple characteristics of a minute object. A suitable spec of cantilever is different depending on the measurement detail.

According to another embodiment, the minute object characteristics measuring apparatus may include multiple cantilevers so that the multiple characteristics can be measured in a short period of time without an effort of replacing cantilever.

Third Embodiment

Figure 13A:
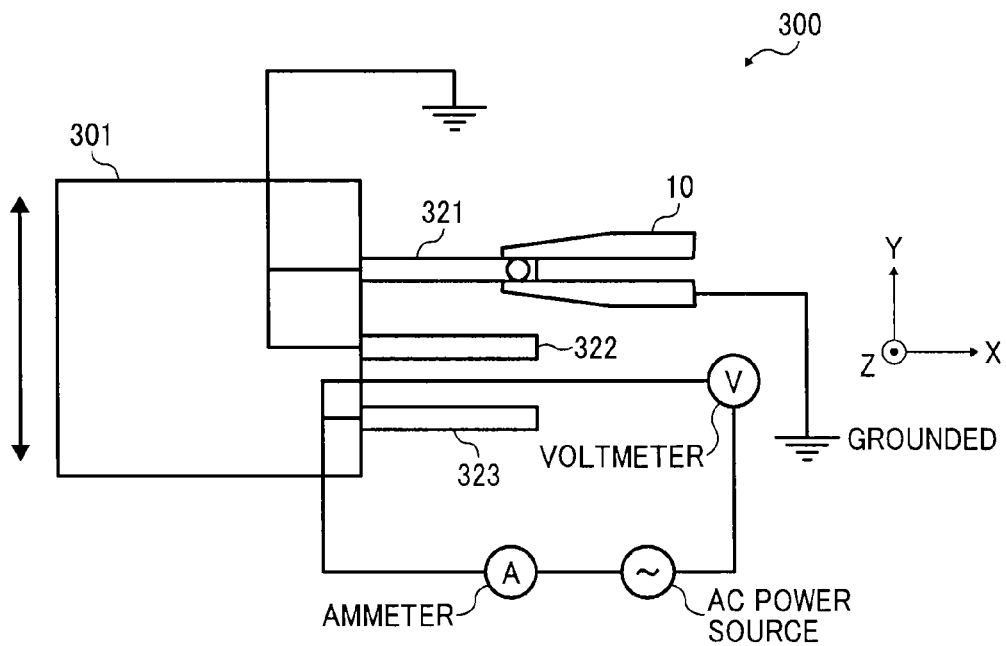
FIGS. 13A and 13B are schematic views of a minute object characteristics measuring apparatus according to the third embodiment of the present invention.
Figure 13B:
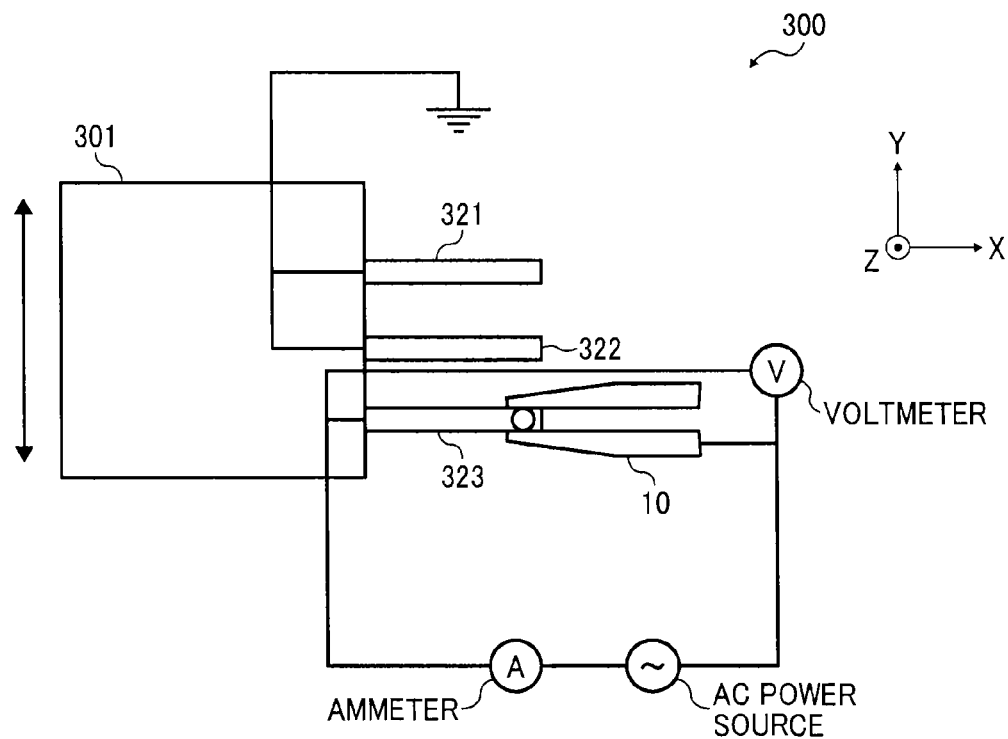

FIGS. 13A and 13B are schematic views of a minute object characteristics measuring apparatus 300 according to a third embodiment of the present invention. FIGS. 13A and 13B illustrate the minute object characteristics measuring apparatus 300 in measuring the amount of charge and in measuring electric resistance/dielectric constant, respectively. The minute object characteristics measuring apparatus 300 includes multiple cantilevers and a holding jig (i.e., cantilever holder) 301, the position thereof is variable in the Y-axis direction. The minute object characteristics measuring apparatus 300 can effectively perform multiple types of measurements. In FIGS. 13A and 13B, the micromotion stage 50, the laser displacement meter 30, and the processor 60 are omitted. A cantilever 321 for measuring the amount of charge and a cantilever 322 for measuring adhesive force are conductive and grounded. A cantilever 323 for measuring electric resistance/dielectric constant forms a circuit with a power source, an ammeter, and a voltmeter. The positions of the cantilevers are variable only by varying the position of the holding jig 301. Thus, it is possible to change the type of measurement in a short period of time.

As a modification of the third embodiment, the cantilever 321 for measuring the amount of charge may have a voltage applying function (e.g., a charger) for determining the charging polarity of the minute object. Instead of moving the holding jig 301 in the Y-axis direction, the holder 10 may be moved in the Y-axis direction. In the case where the measurement target is electric resistance only, the alternating-current power source illustrated in FIGS. 13A and 13b may be replaced with a direct-current power source. The measurement functions of the cantilevers are not limited to those illustrated in FIGS. 13A and 13B. For example, a single cantilever may be given a function of measuring both mirror force and adhesive force, and another single cantilever may be given a function of measuring both electric resistance and dielectric constant. In addition, another cantilever for measuring charging polarity may also be provided.

According to the third embodiment of the present invention, the minute object characteristics measuring apparatus 300 includes: the holder 10 to hold a minute object; a cantilever device integrally including multiple cantilevers 321, 322, and 323, each of which is capable of facing the minute object held by the holder 10; the laser displacement meter 30 to measure a displacement of one of the cantilevers which is facing the minute object held by the holder 10; and the driver including the micromotion stage 50 to move one of the holder 10 holding the minute object or the cantilever device to a position where the minute object held by the holder 10 and the one of the cantilevers face with each other, and to drive the one of the holder 10 holding the minute object and the cantilever device in a direction that the minute object held by the holder 10 and the one of the cantilevers are brought close to or drawn away from each other.

According to this embodiment, a suitable cantilever can be easily and rapidly selected in accordance with the measurement target (e.g., the mirror force, adhesive force, or charging polarity of a minute object). Thus, the time required for measuring multiple characteristics (measurement targets) can be shortened.

If a single minute object is to be subjected to multiple measurements of characteristics, the single minute object, being very small in size, should be transferred among the multiple instruments. Thus, a high degree of positioning technology is required and the time for evaluation is elongated.

According to the present embodiment, the holder 10 is conductive, and at least one of the multiple cantilevers is conductive. The minute object characteristics measuring apparatus 300 further includes the power source having polar opposites, each of which is independently connected to the holder 10 or the conductive cantilever, and the ammeter to measure a current flowed between the conductive cantilever and the holder 10 when the conductive cantilever and the holder 10 are electrically continuous through the minute object.

According to this embodiment, a suitable cantilever can be easily and rapidly selected in accordance with the measurement target (e.g., the electric resistance of a minute object). Thus, the time required for measuring can be shortened.

The minute object characteristics measuring apparatus 300 further includes the processor 60 to control the driver including the micromotion stage 50 and to determine characteristics of the minute object based on the measurement result from the laser displacement meter 30. Thus, the minute object characteristics measuring apparatus 300 can automatically and accurately measure characteristics (e.g., mirror force, adhesive force, charging polarity) of the minute object.

The minute object characteristics measuring apparatus 300 can determine characteristics of the minute object based on the measurement results from the ammeter when the minute object held by the holder 10 and the conductive cantilever are in contact with each other. Thus, the minute object characteristics measuring apparatus 300 can automatically and accurately measure characteristics (e.g., electric resistance) of the minute object, if required.

The power source is an alternating-current power source. The minute object characteristics measuring apparatus 300 further includes the voltmeter to measure a voltage applied to the minute object when the conducive cantilever and the holder 10 are electrically continuous through the minute object. The processor 60 can determine electric characteristics of the minute object based on the measurement results from the ammeter and the voltmeter when the minute object held by the holder 10 and the conductive cantilever are in contact with each other. Thus, the minute object characteristics measuring apparatus 300 can automatically and accurately measure characteristics (e.g., electric resistance, dielectric constant) of the minute object.

The processor 60 is capable of changing the voltage applying condition for each cantilever independently. Thus, many types of measurements can be performed with a small number of cantilevers, and the measurement target can be rapidly changed.

According to the second and third embodiments, the minute object is held by the holder 10. Alternatively, the minute object may be fixed (e.g., adhesively bonded) to a conductive member. In this case, similar to the second and third embodiments, the electric resistance and dielectric constant of the minute object can be measured by bringing the minute object fixed to the conductive member and the cantilever into contact with each other.

Figure 14:
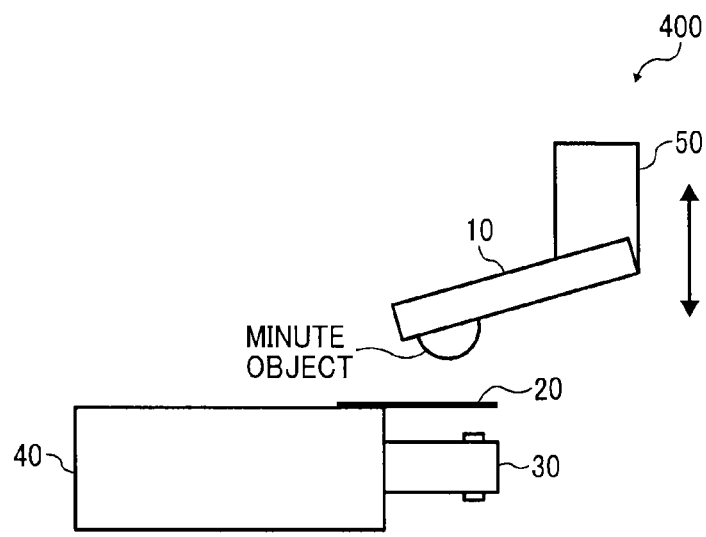
FIG. 14 is a schematic view of a minute object characteristics measuring apparatus according to another embodiment (Modification 1) of the present invention.
Figure 15:
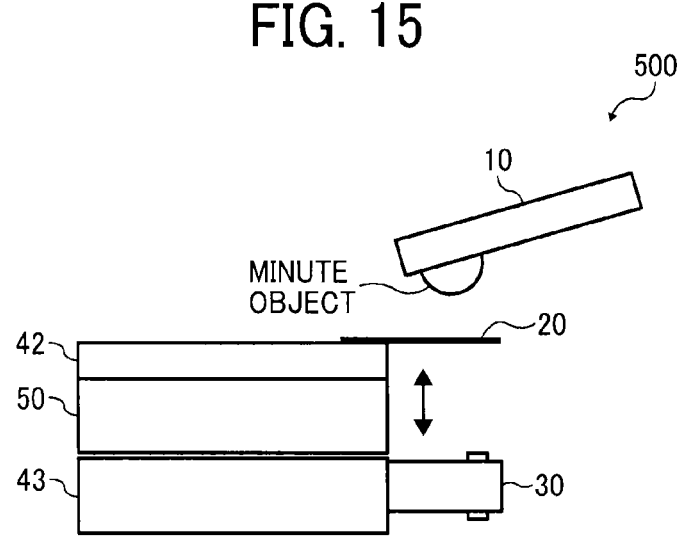
FIG. 15 is a schematic view of a minute object characteristics measuring apparatus according to another embodiment (Modification 2) of the present invention.

According to the first embodiment illustrated in FIG. 1, the micromotion stage 50, the laser displacement meter 30, and the cantilever 20 are integrated. The configuration illustrated in FIG. 1 is relatively insulated from the influence of vibration noise. FIG. 14 is a schematic view of a minute object characteristics measuring apparatus 400 according to another embodiment (Modification 1) of the present invention. In the minute object characteristics measuring apparatus 400, the holder 10 and the micromotion stage 50 are integrated so that the holder 10 and the micromotion stage 50 can be micro-moved together. FIG. 15 is a schematic view of a minute object characteristics measuring apparatus 500 according to another embodiment (Modification 2) of the present invention. In the minute object characteristics measuring apparatus 500, a displacement meter fixing jig 43 for fixing the laser displacement meter 30 and a cantilever fixing jig 42 for fixing the cantilever 20 are independently provided, so that only the cantilever 20 and the cantilever fixing jig 42 are micro-moved along with the micromotion stage 50.

In the configuration illustrated in FIG. 15, even when no force is acting on the cantilever 20 and the cantilever 20 is not deformed, the cantilever 20 moves relative to the laser displacement meter 30 along the movement of the micromotion stage 50, thus varying the measurement value of the laser displacement meter 30. Therefore, in measuring mirror force or adhesive force, the displacement caused due to the deformation of the cantilever 20 should be determined based on the difference between the measurement value of the laser displacement meter 30 and the amount of movement of the micromotion stage 50 (i.e., the amount of movement of the cantilever 20).

Figure 16:
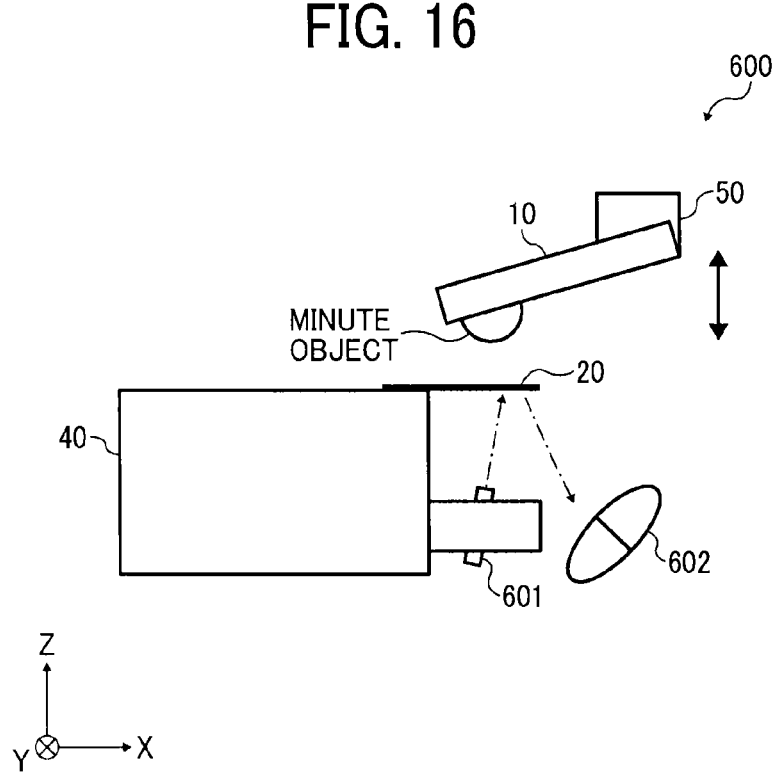
FIG. 16 is a schematic view of a minute object characteristics measuring apparatus according to another embodiment (Modification 3) of the present invention.
Figure 17:
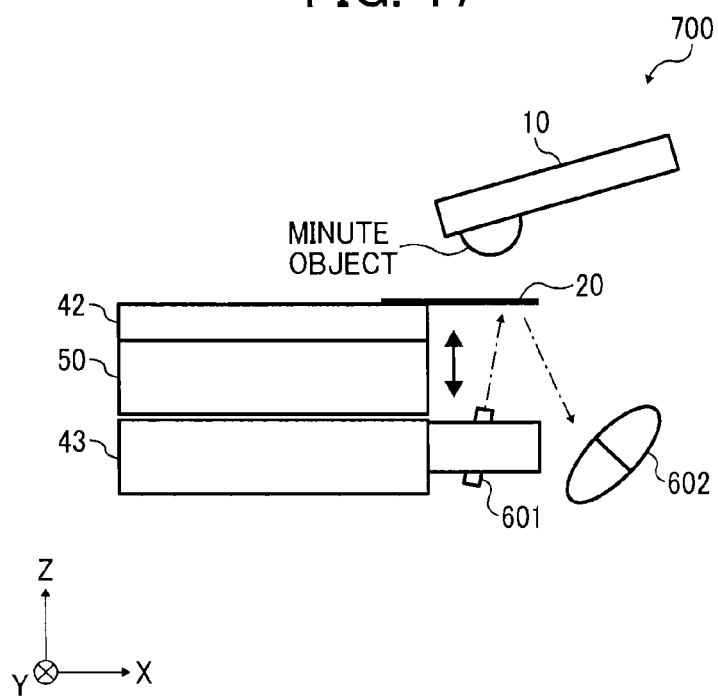
FIG. 17 is a schematic view of a minute object characteristics measuring apparatus according to another embodiment (Modification 4) of the present invention.

Means for detecting the displacement of the cantilever 20 is not limited to the laser displacement meter 30 that directly measures the displacement distance. FIGS. 16 and 17 are schematic views of minute object characteristics measuring apparatuses 600 and 700 according to other embodiments (Modifications 3 and 4, respectively) of the present invention. In these embodiments, a laser light source 601 emits laser light to the cantilever 20, and a two-division detector 602 (e.g., two-division photodiode, two-division phototransistor) having two light-receiving areas detects the reflected light. More specifically, a change in the angle of progress of the reflected light caused due to the deformation of the cantilever 20 is detected based on the position on the two-division detector 602 where the reflected light is received. As the cantilever 20 undergoes a deflection, the center of the laser light that falls on the two-division detector 602 undergoes a shift, thus changing the output difference between the two light-receiving areas. The amount of deflection of the cantilever 20 can be calculated based on that change. The principle of this method for measuring the displacement of the cantilever 20 is similar to that of the optical lever method generally used in atomic force microscope. Depending on the installation size of the two-division detector 602, the fixing jig 40 having a large height (thickness) dimension may be used as illustrated in FIG. 16, or the micromotion stage 50 and the cantilever 20 may not be integrated as illustrated in FIG. 17. The configuration is not limited thereto.

Each of the minute object characteristics measuring apparatuses 600 and 700 according to Modifications 3 and 4, respectively, includes the laser light source 601 to emit laser light to the cantilever 20 and the two-division detector 602 that is an optical detector having two light-receiving areas to detect the light emitted from the laser light source 601 and reflected from the cantilever 20. According to these embodiments, the measurement accuracy is more improved than the case of using the laser displacement meter 30.

Fourth Embodiment

Figure 18:
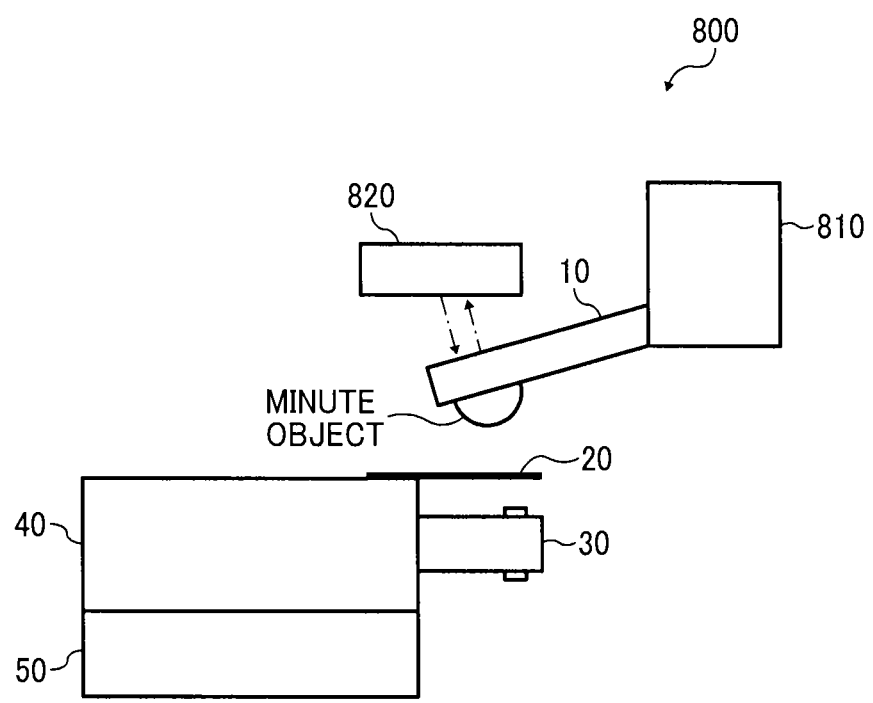
FIG. 18 is a schematic view of a minute object characteristics measuring apparatus according to the fourth embodiment of the present invention.

FIG. 18 is a schematic view of a minute object characteristics measuring apparatus 800 according to a fourth embodiment of the present invention. In the minute object characteristics measuring apparatus 800, the fixing jig 40 to which the cantilever 20 and the laser displacement meter 30 are fixed is placed on the micromotion stage 50, and the minute object held by the holder 10 can be positioned on the upper side the cantilever 20. The minute object characteristics measuring apparatus 800 further includes a vibrator 810 to vibrate the holder 10 and a measuring device 820 disposed on the upper side of the holder 10 to measure a displacement (e.g., vibration amplitude) of the holder 10 caused due to vibration.

Figure 19A:
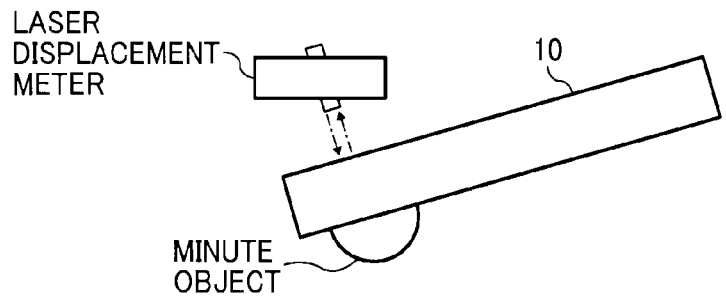
FIGS. 19A to 19C are schematic views of various systems for measuring the displacement of the holder caused by vibration.
Figure 19B:
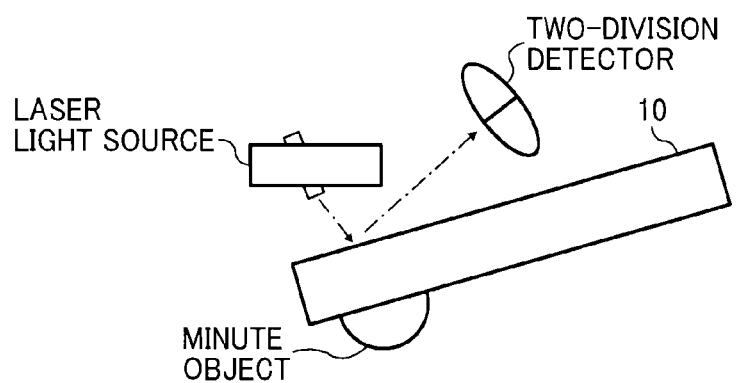
Figure 19C:
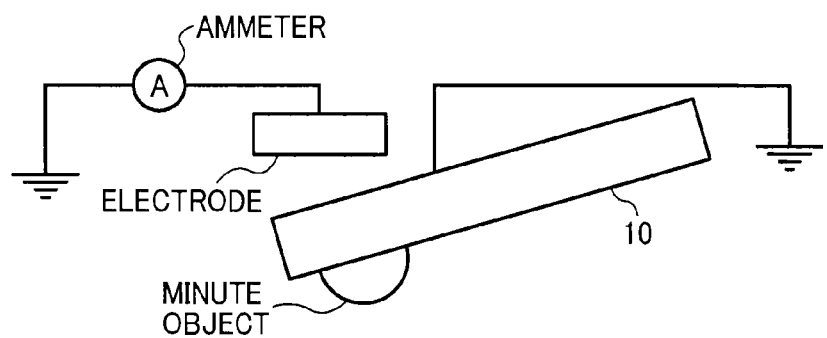

The measuring device 820 may be a laser displacement meter, as illustrated in FIG. 19A. Alternatively, the measuring device 820 may employ an optical lever method or a capacitance method, as illustrated in FIGS. 19B and 19C, respectively. The measuring device 820 may be placed at any position, except for positions on the optical axis of observation means (e.g., an optical microscope, an electron microscope) or on the movement axis of the holder 10, so long as the amount of displacement of the cantilever 20 in the direction of displacement (bending) can be measured.

The vibrator 810 may include a piezoelectric element. The vibrator 810 may be placed at any position so long as it is in contact with the holder 10. Preferably, the vibrator 810 vibrates the holder 10 only. If a vibration is transmitted to the cantilever 20 through other members even when the holder 10 is not in direct contact with the cantilever 20, the measurement accuracy drastically deteriorates.

As the cantilever 20, a cantilever used for atomic force microscope (AFM) can be used. A suitable cantilever with a proper spring constant and a proper material should be selected in accordance with the measurement details. Generally, the cantilever used for AFM has a chip for scanning a specimen on its free end. When used as the cantilever 20 according to the fourth embodiment, however, the cantilever does not uses the chip. Namely, either a chip-less cantilever or a cantilever having a chip can be used in the fourth embodiment. In the latter case, the cantilever is so fixed that the chip faces toward the laser displacement meter 30 side, not the minute object side.

The laser displacement meter 30 is not limited to a specific product. To make it possible to monitor deformation of the cantilever 20, the spot size of the laser displacement meter 30 is preferably equivalent to or smaller than the width of the cantilever 20. To make it possible to detect micro-deformation of the cantilever 20, the measurement resolution of the laser displacement meter 30 is preferably as high as possible. In particular, the laser displacement meter 30 preferably has a measurement resolution of about 1 nm.

The micromotion stage 50 has a position resolution of nanometer order. In particular, a piezo stage (i.e., a stage having a piezo element as an actuator) is preferably used therefor.

The holder 10 may be a micro/nano gripper or micro/nano tweezers that holds a minute object by pinching it with both ends thereof, as illustrated in FIG. 2. The holder 10 may also be a micro/nano pipette that holds (adsorbs) a minute object by sucking it, as illustrated in FIGS. 3A and 3B. The holder 10 may be equipped with a contact sensor. According to the fourth embodiment, the same function as the function of the contact sensor can be obtained by continuously vibrating the holder 10 while monitoring the displacement of the holder 10.

Minute objects having a size in the range of 10 nm to 1 mm, preferably 1 to 100 μm, which can be held by the holder illustrated in FIG. 2, 3A, or 3B, are suitable as measuring objects in the fourth embodiment. Specific examples of the minute object include, but are not limited to: powders used as constitutional materials of electrophotographic toners, pharmaceutical products, food products, and electronic devices; minute foreign substances attached to electronic substrates; and biological materials such as cells.

Whether contaminant is attached to the holder 10 or not can be determined by vibrating the holder 10 by the vibrator 810 and measuring the vibration amplitude by the measuring device 820. Prior to this measurement, to obtain a reference value, the holder 10 that is clean or in the initial condition is vibrated and the vibration amplitude is measured. Thereafter, the vibration amplitude is measured again on a timely basis or in each measurement without the holder 10 holding minute object. Since the vibration amplitude depends on the weight of the holder 10, the vibration amplitude varies depending on the weight of the contaminant on the holder 10, if any. In particular, the greater the amount of contaminant, the smaller the vibration amplitude. Whether contaminant is attached or not can be determined by comparing the measured value and the reference value. The measurement of vibration amplitude may be conducted during either the period of vibrating the holder 10 or the period of damped vibration that comes immediately after the period of vibrating.

Contaminant attached to the holder 10 can be removed by vibrating the holder 10 while giving an acceleration which is in excess of the adhesive force between the holder 10 and the contaminant to the holder 10. Whether the contaminant has been removed or not can be determined in the same manner as the above-described procedure for determining the contamination condition.

A measurement procedure by the minute object characteristics measuring apparatus 800 according to the fourth embodiment is described below.

Measurement of Mirror Force (Amount of Charge)

A method of measuring mirror force depending on the amount of charge of a minute object is described below. According to the fourth embodiment, as a minute object held by the holder 10 is brought close to the cantilever 20, mirror charges having the opposite polarity and the equivalent quantity to the charges of the minute object are induced in the cantilever 20, as illustrated in FIG. 6. The mirror force acting between the minute object and the cantilever 20 is measured by the laser displacement meter 30 disposed on the back surface side (-Z side) of the cantilever 20. More specifically, the minute object and the cantilever 20 are brought close to each other by the functions of the specimen stage, the measuring system including the cantilever 20, the laser displacement meter 30, and the micromotion stage 50, and/or the three-dimensional moving mechanism accompanied by the holder 10. The micromotion stage 50 further moves the cantilever 20 toward the minute object side, as illustrated in FIGS. 5A to 5C, and the laser displacement meter 30 measures the amount of deflection of the cantilever 20. The micromotion stage 50 moves until the cantilever 20 and the minute object come into contact with each other. The distance between the minute object and the cantilever 20 before the measurement starts, i.e., before the micromotion stage 50 starts moving, is properly set in accordance with the amount of charge held by the minute object. Preferably, the distance is approximately 1 to 100 μm. When the moving speed of the micromotion stage 50 is too low, the cantilever 20 causes a drift and degrades the S/N (signal-to-noise ratio) of the measurement value. When the moving speed of the micromotion stage 50 is too high, the micromotion stage 50 cannot move following the set speed value. Thus, the moving speed of the micromotion stage 50 is preferably set in the range of 0.1 to 100 μm.

The specs of the cantilever 20 and the laser displacement meter 30 are determined in accordance with the amount of charge held by the minute object. Generally, a cantilever having a lower spring constant and a laser displacement meter having a higher resolution power are more preferred in measuring mirror force than in measuring adhesive force to be described later. Specifically, the cantilever 20 preferably has a spring constant of 0.05 N/m or less, more preferably 0.01 N/m or less. The laser displacement meter 30 preferably has a resolution power of 10 nm or less, more preferably 1 nm or less. The cantilever 20 has a conductive surface and is grounded.

The mirror force measured by the above procedure can be converted into the amount of charge. As an example, the amount of charge of the minute object can be calculated according to the method described in Reference 3 (Yoshinori Nishitani, Hiroaki Muramatu, Hiroyuki Maruyama, Ken-ichiro Tanoue, Shuji Matsusaka, Masuda Hiroaki (Kyoto University Graduate School of Engineering), "Measurement of Interaction Force between Particles and Wall Surfaces in Gas Phase by AFM", Collection of Papers for The Summer Symposium of The Society of Powder Technology, Japan (2000), pp. 67-69).

Determination of Charging Polarity

The minute object characteristics measuring apparatus 800 according to the fourth embodiment can determine the charging polarity of a minute object as follows. First, the cantilever 20 is applied with a voltage while the holder 10 holding the minute object and the cantilever 20 are being close to each other. In the case of applying a positive voltage to the cantilever 20, when the cantilever 20 deforms so as to be attracted to the minute object, the minute object is determined to be negatively charged. When the cantilever 20 deforms so as to be repelled from the minute object, the minute object is determined to be positively charged. The determination can be made in a similar manner even in the case of applying a negative voltage to the cantilever 20. When the cantilever 20 deforms so as to be attracted to the minute object, the minute object is determined to be positively charged. When the cantilever 20 deforms so as to be repelled from the minute object, the minute object is determined to be negatively charged. Preferably, the distance between the cantilever 20 and the minute object is set to 1 to 5 μm. The voltage applied to the cantilever 20 is determined depending on the amount of charge of the minute object. Preferably, the applied voltage is in the range of 0.1 to 3 V in absolute value.

Measurement of Adhesive Force

A method of measuring adhesive force of a minute object is described below. After the minute object and the cantilever 20 are brought into contact with each other, the micromotion stage 50 is moved in a direction that the minute object and the cantilever 20 are drawn away from each other, as illustrated in FIGS. 8A and 8B. Immediately after this movement of the micromotion stage 50, the minute object and the cantilever 20 remain in contact with each other due to the adhesive force acting therebetween. However, after a continuous movement of the micromotion stage 50, the force generated by deflection of the cantilever 20 exceeds the adhesive force between the minute object and the cantilever 20, thereby separating the minute object and the cantilever 20 from each other, as illustrated in FIG. 8C. Thus, the adhesive force between the minute object and the cantilever 20 can be evaluated by acquiring the force acting on the cantilever 20 at the time that the minute object and the cantilever 20 are separated from each other. When the moving speed of the micromotion stage 50 is too low, the cantilever 20 causes a drift and degrades the S/N (signal-to-noise ratio) of the measurement value. When the moving speed of the micromotion stage 50 is too high, the micromotion stage 50 cannot move following the set speed value. Thus, the moving speed of the micromotion stage 50 is preferably set in the range of 0.1 to 100 μm. The specs of the cantilever 20 and the laser displacement meter 30 are determined in accordance with the adhesive force of the minute object. Preferably, the cantilever 20 has a spring constant in the range of 0.01 to 1 N/m, and the laser displacement meter 30 has a resolution power of 100 nm or less. According to the fourth embodiment, the adhesive force is generated between the surface material of the cantilever 20 and the minute object. For the purpose of relative comparison of the adhesive force among the minute objects held by the holder 10, it is not necessary to limit the surface material of the cantilever 20. On the other hand, in the case where the minute object is a material which is likely to easily charge the cantilever 20, it is preferable that the surface of the cantilever 20 contains a conductive material and has electrical continuity. In the case of evaluating a minute object including a material which may contaminate the surface of the cantilever 20 after repeated measurement, it is preferable that the surface of the cantilever 20 is coated with a highly-releasable material. Whether the minute object and the cantilever 20 have come into contact with each other is determined based on the measurement value from the laser displacement meter 30. The amount of deformation (bending) of the cantilever 20 at contacting the minute object is preferably about 1 μm or less, depending on the spring constant of the cantilever 20.

Measurement of Electric Resistance

A method of measuring electric resistance of a minute object is described below with reference to FIG. 10. FIG. 10 illustrates a series circuit including the holder 10 and the cantilever 20 both serving as electrodes, the power source to apply a direct-current voltage to the minute object, and the ammeter to measure a current flowed in the minute object. According to another embodiment, a standard resistance may be inserted into the circuit to measure a voltage drop in the standard resistance with a voltmeter. According to another embodiment, a lock-in amplifier that extracts a specific-frequency component may be provided to apply an alternating current voltage and measure a current. In FIG. 10, the holder 10 is connected to a high terminal (positive pole) of the power source. Alternatively, the cantilever 20 may be connected to the high terminal.

Being served as an electrode, the holder 10 is required to be electrically continuous at least from the contact surface with the minute object to the connection part with the power source. Preferably, the electrical continuity of the holder 10 is 1/10 or less of the resistance value of the minute object. In case a holder having no electrical continuity under normal conditions is employed, electrical continuity should be secured by forming a film on the surface of the holder with gold, copper, tungsten, etc., or by preparing a micro-electrode by means of deposition function such as focused ion beam.

In the measurement, the minute object and the cantilever 20 are brought close to each other by the functions of the specimen stage, the measuring system, and/or the three-dimensional moving mechanism accompanied by the holder 10. The micromotion stage 50 further moves to bring the minute object and the cantilever 20 into contact with each other. Whether the minute object and the cantilever 20 have come into contact with each other is determined based on the measurement value from the laser displacement meter 30. The amount of deformation (bending) of the cantilever 20 at contacting the minute object is preferably about 1 μm or less, depending on the spring constant of the cantilever 20.

The contact condition between the minute object and the electrodes can be accurately managed when one of the electrodes employs a cantilever. The reasons for the accurate management of the contact condition are considered as follows. The first reason is that the pressure applied to the minute object can be managed by measuring the amount of deformation of the cantilever 20 by the laser displacement meter 30. As an example, when the cantilever 20 has a spring constant of 0.01 N/m and the laser displacement meter 30 has a resolution power of 10 nm, the pressure applied to the minute object can be controlled in the 0.1-μN unit. The second reason is that the surface of the cantilever 20 has a high smoothness. Thus, a variation in the contact area of the cantilever 20 with the minute object, which may be caused in each measurement due to the surface roughness of the cantilever 20, can be minimized.

Thereafter, a voltage is applied to the minute object from the direct-current power source illustrated in FIG. 10, a current value flowed in the minute object is read with the ammeter, and the electrical resistance is determined based on the Ohm's law.

The upper limit of the voltage applied to the minute object is preferably about 100 V, for the purpose of avoiding the occurrence of electric discharge between the electrodes. It is preferable to start reading of the current value about one minute after the application of a voltage, for the purpose of avoiding the influence of input inrush current. To obtain a measurement result with a high degree of accuracy, it is preferable to vary the applied voltage value within each measurement, read a variation caused in the current value, and obtain a resistance value by linear regression based on the Ohm's law.

Measurement of Dielectric Constant

Dielectric constant can be measured by replacing the direct-current power source used for measuring electric resistance with an alternating-current power source. The alternating-current power source can measure frequency response of the current flowed in the minute object, and impedance can be determined thereby. Further, by determining capacitor from the impedance, dielectric constant can be obtained.

A method of measuring dielectric constant is described below with reference to FIG. 12. By applying an alternating current voltage to the minute object and measuring a current flowed in and a voltage applied to the minute object, impedance can be measured. The configuration illustrated in FIG. 12 can also measure electrical resistance in addition to dielectric constant.

Measurement of Viscoelasticity

Figures 21, 22A, 22B:
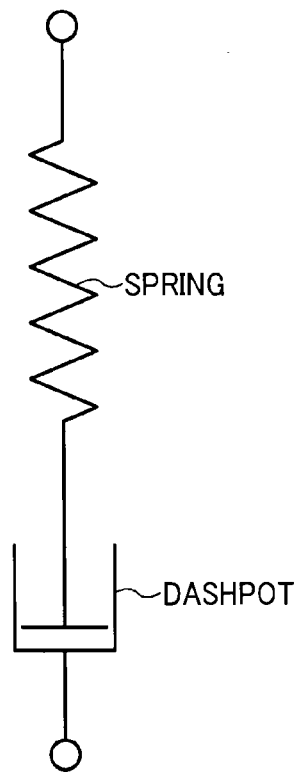
FIG. 21 is an illustration of a Maxwell's model for determining storage elastic modulus and loss elastic modulus.
FIGS. 22A and 22B are formulae representing storage elastic modulus and loss elastic modulus, respectively.

A method of measuring viscoelasticity of a minute object is described below with reference to FIGS. 20A to 20C. In the measurement, after the minute object and the cantilever 20 are brought into contact with each other, as illustrated in FIG. 20A, the holder 10 is caused to vibrate. Upon vibration of the holder 10, the cantilever 20 is caused to vibrate in accordance with the viscoelasticity of the minute object, as illustrated in FIGS. 20B and 20C. A displacement (e.g., vibration amplitude) of the cantilever 20 caused by the vibration is measured by the measuring device 820. Storage elastic modulus and loss elastic modulus can be determined based on the input vibration displacement of the holder 10 and the output displacement and amount of phase shift of the cantilever 20. These values are calculated based on a suitable model. As an example, a Maxwell's model illustrated in FIG. 21 can be used. Based on the Maxwell's model, storage elastic modulus and loss elastic modulus are represented by the formulae shown in FIGS. 22A and FIG. 22B, respectively. The stress σ is represented by the product of the displacement of the cantilever 20 and the spring constant of the cantilever 20. The vibration amplitude and frequency of the holder 10 and the spring constant of the cantilever 20 are determined in accordance with the viscoelasticity of the minute object. Preferably, the amplitude of the holder 10 is from several nanometers to several ten nanometers, the frequency of the holder 10 is from several hertz to several kilohertz, and the spring constant of the cantilever 20 is from 0.01 N/m to several ten newtons-per-meter.

Frequency of Vibrator

According to the fourth embodiment, the frequency of the vibrator 810 may be either fixed to a specific value or continuously varied. As an example, by continuously varying the frequency while measuring a variation in natural frequency of the holder 10, whether contaminant exists or not can be determined with a high degree of sensitivity. As another example, by continuously varying the frequency in measuring viscoelasticity, frequency dependency of storage elastic modulus and loss elastic modulus can be measured.

Direction of Vibration of Holder

Figure 23:
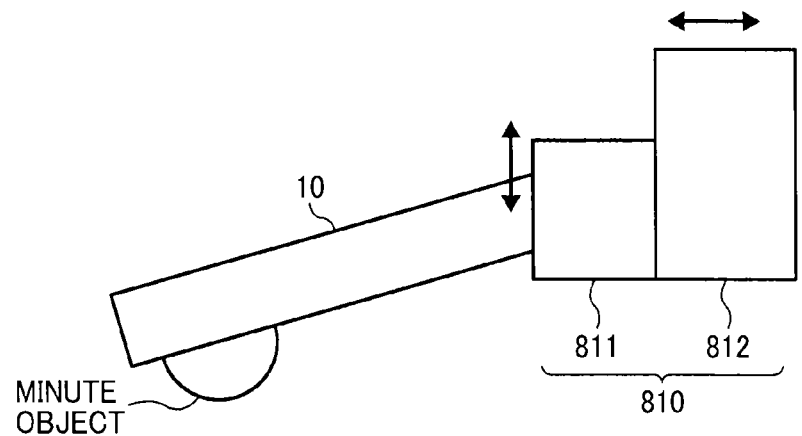
FIG. 23 is a schematic view of a vibrator for vibrating the holder according to some embodiments of the present invention.

According to the fourth embodiment, in measuring viscoelasticity, the holder 10 preferably vibrates in a direction almost parallel to the direction of displacement of the cantilever 20. Alternatively, the holder 10 may vibrate in another direction such as a direction almost perpendicular to the direction of displacement of the cantilever 20. As an example, the vibrator 810 may include a vibration unit 811 to vibrate the holder 10 in a direction almost parallel to the direction of displacement of the cantilever 20 and another vibration unit 812 to vibrate the holder 10 in a direction almost perpendicular to the direction of displacement of the cantilever 20, as illustrated in FIG. 23. In this case, contaminants attached to the holder 10 can be more reliably removed. In the configuration illustrated in FIG. 23, the vibration unit 811 is in contact with the holder 10, and the vibration unit 812 is in contact with the vibration unit 1. Owing to this configuration, the holder 10 is capable of vibrating in two directions perpendicular to each other either simultaneously or independently.

Accordingly, the vibrator 810 to vibrate the holder 10 may include at least one vibration unit (e.g., a piezo element). The at least one vibration unit may be in either direct contact with the holder 10 or indirect contact with the holder 10 via another vibration unit or member.

According to the fourth embodiment of the present invention, the minute object characteristics measuring apparatus 800 includes the vibrator 810 to vibrate the holder 10.

According to this embodiment, contaminants attached to the holder 10 can be removed, and viscoelasticity of a minute object can be measured.

In the case where the vibrator 810 is capable of vibrating the holder 10 in the direction of displacement of the cantilever 20, quantitative evaluation of viscoelasticity can be performed by measurement of dynamic viscoelasticity.

In the case where the vibrator 810 is used for removing contaminants attached to the holder 10, the vibrator 810 may vibrate the holder 10 in a direction other than the direction of displacement of the cantilever 20.

In the case where the minute object characteristics measuring apparatus 800 further includes the measuring device 820 to measure a displacement of the holder 10 caused by vibration, contamination condition of the holder 10 can be easily determined and the contaminants can be easily and reliably removed. Thus, characteristics of a minute object can be measured with a high degree of accuracy.

In particular, by measuring a variation in vibration amplitude of the holder 10, contamination condition of the holder 10 can be easily obtained without direct observation thereof. In addition, by vibrating the holder 10, contaminants can be easily removed. Moreover, by measuring the vibration amplitude of the holder 10 to measure a weight variation, whether removal of contaminants has been completed or not can be determined.

In the case where the vibrator 810 is used for measuring viscoelasticity of a minute object, the measuring device 820 is not necessary.

In the case where the measuring device 820 is a laser displacement meter, the amount of displacement of the holder 10 caused by vibration can be measured with a high degree of accuracy.

In the case where the measuring device 820 includes a light emitter to emit light to the holder 10 and a light detector having two light-receiving areas to detect light reflected from the holder 10, the amount of displacement of the holder 10 caused by vibration can be measured with a high degree of accuracy.

In the case where the measuring device 820 measures a variation in capacitance between the holder 10 and an electrode disposed facing the holder 10, the amount of displacement of the holder 10 caused by vibration can be measured with a high degree of accuracy.

In the case where the vibrator 810 is capable of varying the frequency of the holder 10, contamination condition of the holder 10 can be determined with a high degree of sensitivity by measuring the natural frequency of the holder 10. In addition, by varying the frequency in measuring viscoelasticity, frequency dependency can be measured.

In the case where the vibrator 810 is capable of varying the direction of vibration of the holder 10, contaminants are reliably removed from any position by vibrating the holder 10 in a proper direction.

In the case where the vibrator 810 includes a piezoelectric element, the holder 10 can be reliably vibrated with a high degree of accuracy. In the case where the vibrator 810 includes at least one vibration unit, a device (e.g., vibration motor) capable of vibrating the holder 10 may be provided in place of or in addition to the piezoelectric element.

Fifth Embodiment

Figure 24:
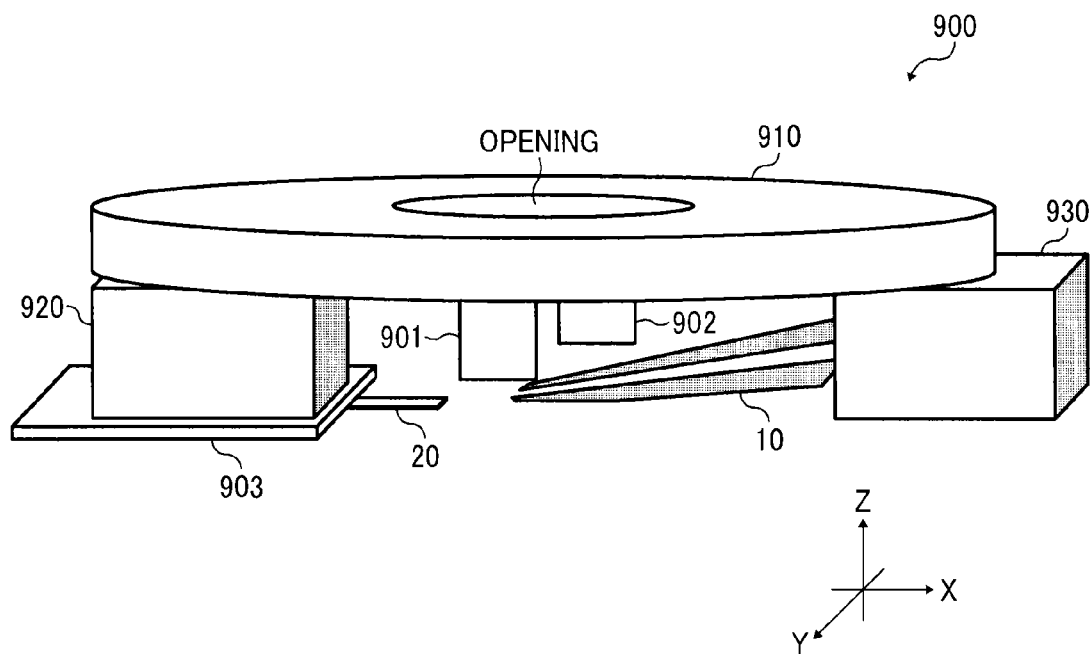
FIG. 24 is a schematic view of a minute object characteristics measuring apparatus according to the fifth embodiment of the present invention.

A minute object characteristics measuring apparatus 900 according to the fifth embodiment is described below. FIG. 24 is a schematic view of the minute object characteristics measuring apparatus 900 according to the fifth embodiment of the present invention. The minute object characteristics measuring apparatus 900 includes a supporting member 910 in a ring-like form, and a Z stage 930 and a horizontal movement stage 920 both disposed at the periphery of the opening of the supporting member 910. The Z stage 930 is a micromotion stage movable in the vertical direction while holding the holder 10. The horizontal movement stage 920 is movable in the horizontal direction while holding the cantilever 20. When the minute object characteristics measuring apparatus 900 is in use, a microscope (e.g., optical microscope, electron microscope) is set up so that the lens thereof is inserted into the opening of the supporting member 910, as illustrated in FIG. 26. In FIG. 26, the microscope is omitted except for the lens thereof.

According to the fifth embodiment, the supporting member 910, serving as a support, is a ring-like platy member. The supporting member 910 is not limited thereto so long as it has an opening or a cutout into which the lens can be inserted. The support may be formed of either a single material or multiple materials.

In the minute object characteristics measuring apparatus 900 according to the fifth embodiment, the opening of the supporting member 910 may be positioned on the upper side of the specimen stage, as illustrated in FIG. 26. Owing to this configuration, a collection operation of the holder 10 to collect a minute object from the specimen stage and a measurement operation of the holder 10 holding the minute object and the cantilever 20 can be continuously and effectively performed under the observation with the microscope.

Figure 25A:
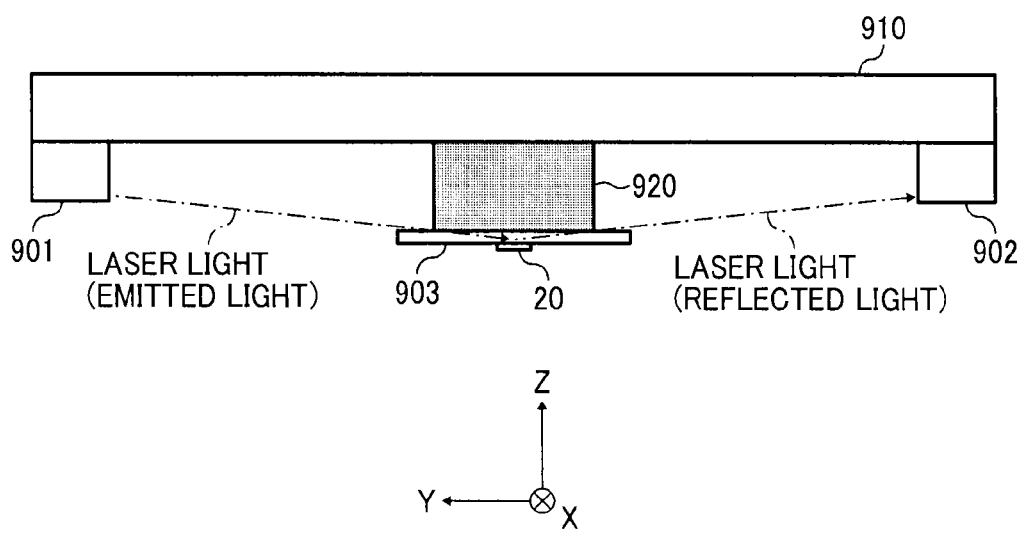
FIGS. 25A and 25B are schematic views of a system for measuring the displacement of the cantilever according to the fifth embodiment of the present invention.
Figure 25B:
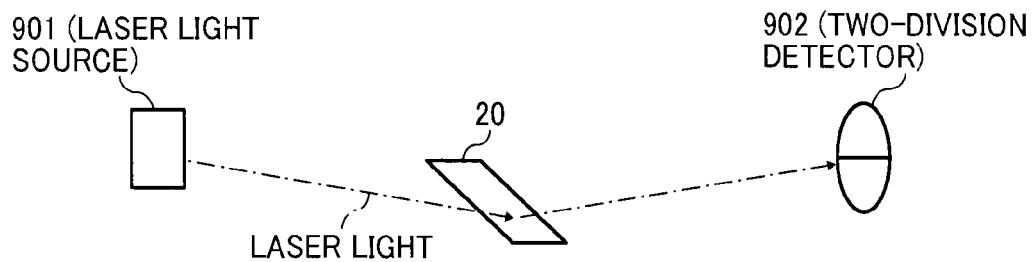

In the fifth embodiment, the displacement of the cantilever 20 is measured by an optical lever method, as illustrated in FIGS. 25A and 25B. According to the optical lever method, a light emitter 901 (e.g., laser light source) emits laser light to the cantilever 20, and a light detector 902 (e.g., two-division detector) detects the light reflected therefrom. A force acting on the cantilever 20 can be measured by detecting a movement of the reflected light caused by deformation of the cantilever 20 on the light detector 902.

As the cantilever 20, a cantilever used for atomic force microscope (AFM) can be used. A suitable cantilever with a proper spring constant and a proper material should be selected in accordance with the measurement details. Generally, the cantilever used for AFM has a chip for scanning a specimen on its free end. When used as the cantilever 20 according to the fifth embodiment, however, the cantilever does not uses the chip. Namely, either a chip-less cantilever or a cantilever having a chip can be used in the fifth embodiment. In the latter case, the cantilever is so fixed that the chip faces toward the laser emission side, not the minute object side.

The cantilever 20 is mounted on the horizontal movement stage 920 via a cantilever holder 903. If the cantilever 20 comes within the field of the microscope when picking a minute object, it becomes difficult for the holder 10 to picking up the minute object. Owing to the provision of the cantilever holder 30, the cantilever 20 can come close to the position where the minute object is held by the holder 10 after the minute object has been picked up by the holder 10.

Preferably, the moving distance of the horizontal movement stage 920 is from several to several ten nanometers, and the position resolution thereof is from 0.1 to 0.5 μm. Specific examples of the horizontal movement stage 920 include, but are not limited to, a stepping motor and a linear motor.

The Z stage 930 for holding the holder 10 has two functions. The first function is to adjust the height of the holder 10 from the minute object in the Z direction, and the second function is to adjust the distance between the minute object and the cantilever 20 at the time of measuring characteristics (e.g., adhesive force, the amount of charge) of the minute object. In particular, since the second function requires a position resolution of nanometer order, a piezo stage is preferably used for the Z stage 930.

The holder 10 may be a micro/nano gripper or micro/nano tweezers that holds a minute object by pinching it with both ends thereof, as illustrated in FIG. 2. The holder 10 may also be a micro/nano pipette that holds (adsorbs) a minute object by sucking it, as illustrated in FIGS. 3A and 3B.

Minute objects having a size in the range of 10 nm to 1 mm, preferably 1 to 100 μm, which can be held by the holder illustrated in FIG. 2, 3A, or 3B, are suitable as measuring objects in the fifth embodiment. Specific examples of the minute object include, but are not limited to: powders used as constitutional materials of electrophotographic toners, pharmaceutical products, food products, and electronic devices; minute foreign substances attached to electronic substrates; and biological materials such as cells.

A measurement procedure by the minute object characteristics measuring apparatus 900 according to the fifth embodiment is described below.

Measurement of Mirror Force (Amount of Charge)

A method of measuring mirror force depending on the amount of charge of a minute object is described below. In the minute object characteristics measuring apparatus 900, as a minute object held by the holder 10 is brought close to the cantilever 20, mirror charges having the opposite polarity and the equivalent quantity to the charges of the minute object are induced in the cantilever 20, as illustrated in FIG. 28. The mirror force acting between the minute object and the cantilever 20 is measured by the optical lever disposed on the back surface side (−Z side) of the cantilever 20.

More specifically, the minute object and the cantilever 20 are brought close to each other by the functions of the specimen stage, the horizontal movement stage 920 holding the cantilever 20, and the Z stage 930 holding the holder 10, as illustrated in FIG. 27A. The Z stage 930 further moves the minute object held by the holder 10 toward the cantilever 20 side, as illustrated in FIGS. 27B and 27C, and the optical lever measures the amount of deflection of the cantilever 20. The Z stage 930 moves until the cantilever 20 and the minute object come into contact with each other.

The distance between the minute object and the cantilever 20 before the measurement starts, i.e., before the Z stage 930 starts moving, is properly set in accordance with the amount of charge held by the minute object. Preferably, the distance is approximately 1 to 100 μm. When the moving speed of the Z stage 930 is too low, the cantilever 20 causes a drift and degrades the S/N (signal-to-noise ratio) of the measurement value. When the moving speed of the Z stage 930 is too high, the Z stage 930 cannot move following the set speed value. Thus, the moving speed of the Z stage 930 is preferably set in the range of 0.1 to 100 μm.

The specs of the cantilever 20 and the optical lever are determined in accordance with the amount of charge held by the minute object. Generally, a cantilever having a lower spring constant and an optical lever having a higher resolution power are more preferred in measuring mirror force than in measuring adhesive force to be described later. Specifically, the cantilever 20 preferably has a spring constant of 0.05 N/m or less, more preferably 0.01 N/m or less. The optical lever preferably has a resolution power of 10 nm or less, more preferably 1 nm or less. The cantilever 20 has a conductive surface and is grounded.

The mirror force measured by the above procedure can be converted into the amount of charge. As an example, the amount of charge of the minute object can be calculated according to the method described in Reference 3 (Yoshinori Nishitani, Hiroaki Muramatu, Hiroyuki Maruyama, Ken-ichiro Tanoue, Shuji Matsusaka, Masuda Hiroaki (Kyoto University Graduate School of Engineering), "Measurement of Interaction Force between Particles and Wall Surfaces in Gas Phase by AFM", Collection of Papers for The Summer Symposium of The Society of Powder Technology, Japan (2000), pp. 67-69).

Determination of Charging Polarity

The minute object characteristics measuring apparatus 900 according to the fifth embodiment can determine the charging polarity of a minute object as follows. First, the cantilever 20 is applied with a voltage while the holder 10 holding the minute object and the cantilever 20 are being close to each other. In the case of applying a positive voltage to the cantilever 20, when the cantilever 20 deforms so as to be attracted to the minute object, the minute object is determined to be negatively charged. When the cantilever 20 deforms so as to be repelled from the minute object, the minute object is determined to be positively charged. The determination can be made in a similar manner even in the case of applying a negative voltage to the cantilever 20. When the cantilever 20 deforms so as to be attracted to the minute object, the minute object is determined to be positively charged. When the cantilever 20 deforms so as to be repelled from the minute object, the minute object is determined to be negatively charged. Preferably, the distance between the cantilever 20 and the minute object is set to 1 to 5 μm. The voltage applied to the cantilever 20 is determined depending on the amount of charge of the minute object. Preferably, the applied voltage is in the range of 0.1 to 3 V in absolute value.

Measurement of Adhesive Force

A method of measuring adhesive force of a minute object is described below. After the minute object and the cantilever 20 are brought into contact with each other, as illustrated in FIG. 29A, the Z stage 930 is moved in a direction that the minute object and the cantilever 20 are drawn away from each other, as illustrated in FIG. 29B. Immediately after this movement of the Z stage 930, the minute object and the cantilever 20 remain in contact with each other due to the adhesive force acting therebetween. However, after a continuous movement of the Z stage 930, the force generated by deflection of the cantilever 20 exceeds the adhesive force between the minute object and the cantilever 20, thereby separating the minute object and the cantilever 20 from each other, as illustrated in FIG. 29C. Thus, the adhesive force between the minute object and the cantilever 20 can be evaluated by acquiring the force acting on the cantilever 20 at the time that the minute object and the cantilever 20 are separated from each other.

When the moving speed of the Z stage 930 is too low, the cantilever 20 causes a drift and degrades the S/N (signal-to-noise ratio) of the measurement value. When the moving speed of the Z stage 930 is too high, the Z stage 930 cannot move following the set speed value. Thus, the moving speed of the Z stage 930 is preferably set in the range of 0.1 to 100 μm.

The specs of the cantilever 20 and the optical lever are determined in accordance with the adhesive force of the minute object. Preferably, the cantilever 20 has a spring constant in the range of 0.01 to 1 N/m, and the optical lever has a resolution power of 100 nm or less. According to the fifth embodiment, the adhesive force is generated between the surface material of the cantilever 20 and the minute object. For the purpose of relative comparison of the adhesive force among the minute objects held by the holder 10, it is not necessary to limit the surface material of the cantilever 20. On the other hand, in the case where the minute object is a material which is likely to easily charge the cantilever 20, it is preferable that the surface of the cantilever 20 contains a conductive material and has electrical continuity. In the case of evaluating a minute object including a material which may contaminate the surface of the cantilever 20 after repeated measurement, it is preferable that the surface of the cantilever 20 is coated with a highly-releasable material. Whether the minute object and the cantilever 20 have come into contact with each other is determined based on the measurement value from the optical lever. The amount of deformation of the cantilever 20 at contacting the minute object is preferably about 1 μm or less, depending on the spring constant of the cantilever 20.

Measurement of Electric Resistance

A method of measuring electric resistance of a minute object is described below with reference to FIG. 10. FIG. 10 illustrates a series circuit including the holder 10 and the cantilever 20 both serving as electrodes, the power source to apply a direct-current voltage to the minute object, and the ammeter to measure a current flowed in the minute object. According to another embodiment, a standard resistance may be inserted into the circuit to measure a voltage drop in the standard resistance with a voltmeter. According to another embodiment, a lock-in amplifier that extracts a specific-frequency component may be provided to apply an alternating current voltage and measure a current. In FIG. 10, the holder 10 is connected to a high terminal (positive pole) of the power source. Alternatively, the cantilever 20 may be connected to the high terminal.

Being served as an electrode, the holder 10 is required to be electrically continuous at least from the contact surface with the minute object to the connection part with the power source. Preferably, the electrical continuity of the holder 10 is 1/10 or less of the resistance value of the minute object. In case a holder having no electrical continuity under normal conditions is employed, electrical continuity should be secured by forming a film on the surface of the holder with gold, copper, tungsten, etc., or by preparing a micro-electrode by means of deposition function such as focused ion beam.

In the measurement, the minute object and the cantilever 20 are brought close to each other by the functions of the specimen stage, the horizontal movement stage 920 holding the cantilever 20, and the Z stage 930 holding the holder 10. The Z stage 930 further brings the minute object and the cantilever 20 into contact with each other. Whether the minute object and the cantilever 20 have come into contact with each other is determined based on the measurement value from the optical lever. The amount of deformation of the cantilever 20 at contacting the minute object is preferably about 1 μm or less, depending on the spring constant of the cantilever 20.

The contact condition between the minute object and the electrodes can be accurately managed when one of the electrodes employs a cantilever. The reasons for the accurate management of the contact condition are considered as follows. The first reason is that the pressure applied to the minute object can be managed by measuring the amount of deformation of the cantilever 20 by the optical lever. As an example, when the cantilever 20 has a spring constant of 0.01 N/m and the optical lever has a resolution power of 10 nm, the pressure applied to the minute object can be controlled in the 0.1-μN unit. The second reason is that the surface of the cantilever 20 has a high smoothness. Thus, a variation in the contact area of the cantilever 20 with the minute object, which may be caused in each measurement due to the surface roughness of the cantilever 20, can be minimized.

Thereafter, a voltage is applied to the minute object from the direct-current power source illustrated in FIG. 10, a current value flowed in the minute object is read with the ammeter, and the electrical resistance is determined based on the Ohm's law. The upper limit of the voltage applied to the minute object is preferably about 100 V, for the purpose of avoiding the occurrence of electric discharge between the electrodes. It is preferable to start reading of the current value about one minute after the application of a voltage, for the purpose of avoiding the influence of input inrush current. To obtain a measurement result with a high degree of accuracy, it is preferable to vary the applied voltage value within each measurement, read a variation caused in the current value, and obtain a resistance value by linear regression based on the Ohm's law.

Measurement of Dielectric Constant

Dielectric constant can be measured by replacing the direct-current power source used for measuring electric resistance with an alternating-current power source. The alternating-current power source can measure frequency response of the current flowed in the minute object, and impedance can be determined thereby. Further, by determining capacitor from the impedance, dielectric constant can be obtained.

A method of measuring dielectric constant of a minute object is described below with reference to FIG. 12. By applying an alternating current voltage to the minute object, and measuring a current flowed in the minute object by the ammeter and a voltage generated in the minute object by the voltmeter, impedance can be measured. The configuration illustrated in FIG. 12 can also measure electrical resistance in addition to dielectric constant.

Driving Direction of Horizontal Movement Stage

Figure 30A:
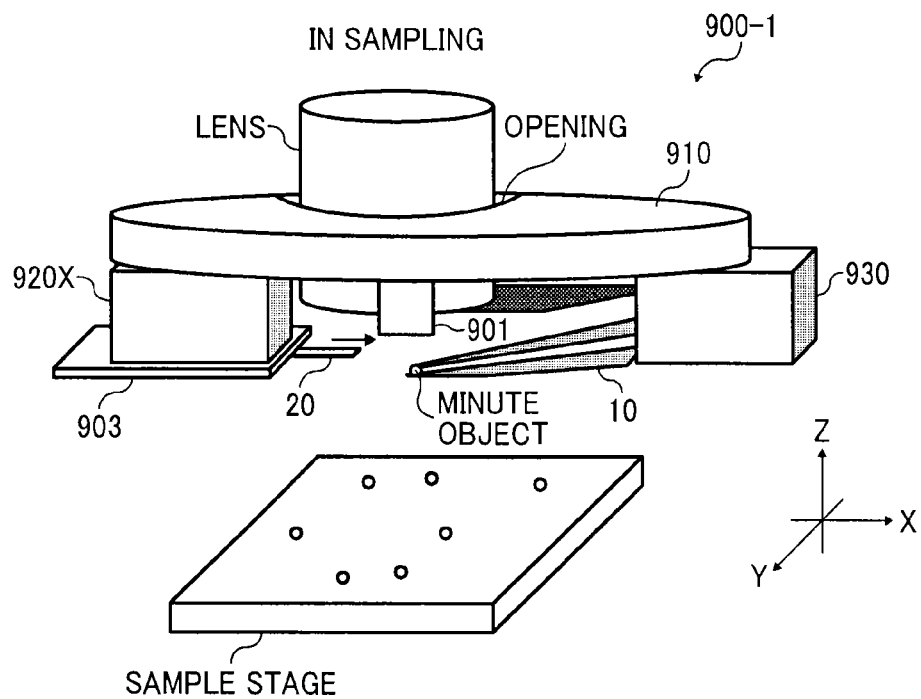
FIGS. 30A and 30B are schematic views of the first example of the minute object characteristics measuring apparatus according to the fifth embodiment of the present invention.
Figure 30B:
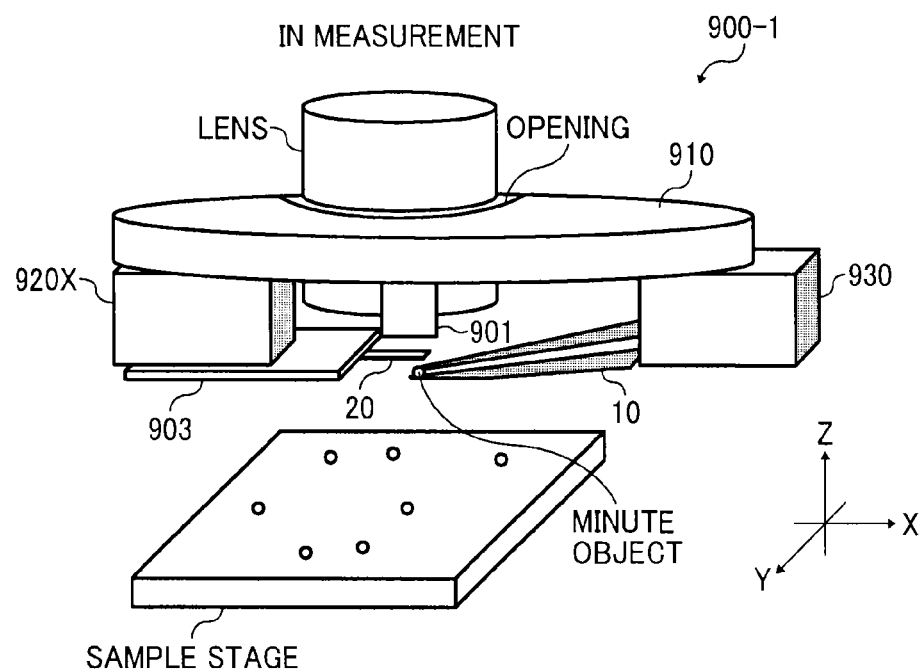

According to the fifth embodiment, the driving direction of the horizontal movement stage 920, for driving the cantilever 20 and the cantilever holder 903, is not limited. As a first example, the driving direction may be coincident with the X-direction that is almost parallel to the installation direction (e.g., a longitudinal direction) of the holder 10, as is the case with an X stage 920X that horizontally moves in the X-direction, installed in a minute object characteristics measuring apparatus 900-1 illustrated in FIGS. 30A and 30B.

Figure 31A:
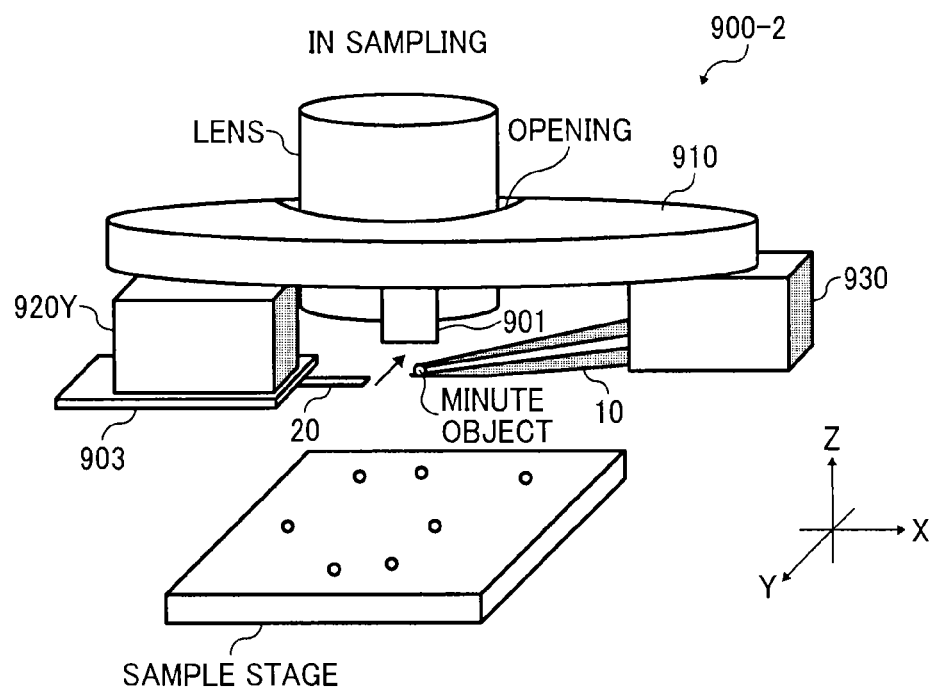
FIGS. 31A and 31B are schematic views of the second example of the minute object characteristics measuring apparatus according to the fifth embodiment of the present invention.
Figure 31B:
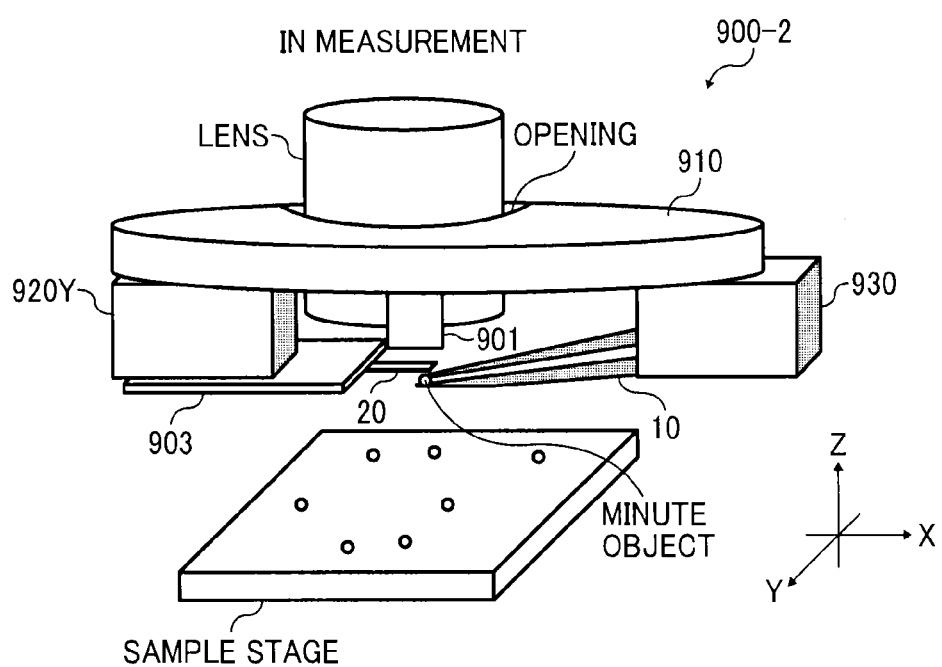

As a second example, the driving direction may be coincident with the Y-axis direction that is almost perpendicular to the installation direction (e.g., a longitudinal direction) of the holder 10, as is the case with a Y stage 920Y that horizontally moves in the Y-axis direction, installed in a minute object characteristics measuring apparatus 900-2 illustrated in FIGS. 31A and 31B. Owing to this configuration, the accuracy in repeated determination of the position (i.e., the degree of reproducibility in position control) of the horizontal movement stage 920 much less influences the accuracy in measurement of adhesive force and the amount of charge. In the second example, the cantilever holder 903 is slidable in the X-axis direction relative to the Y stage 920Y.

The reason is as follows. In the case where the horizontal movement stage 920 moves in the direction almost parallel to the installation direction (e.g., a longitudinal direction) of the holder 10, the position of the holder 10 relative to the longitudinal direction of the cantilever 20 varies, thus possibly varying the measurement sensitivity, as shown in FIG. 32. Namely, compared to a reference state (a), the measurement sensitivity is lowered when the minute object is closer to the fixed end of the cantilever 20 as shown in the state (b), and the measurement sensitivity is increased when the minute object is closer to the free end of the cantilever 20 as shown in the state (c). On the other hand, in the case where the horizontal movement stage 920 moves in the direction almost perpendicular to the installation direction of the holder 10, the position of the holder 10 relative to the longitudinal direction of the cantilever 20 is almost constant.

Positional Relation between Cantilever and Holder in Measurement Operation

Figure 33A:
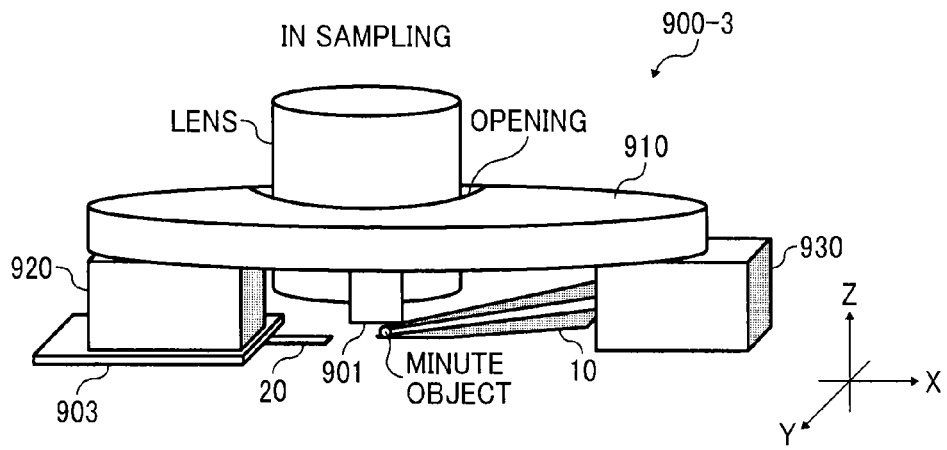
FIGS. 33A to 33C are schematic views of the third example of the minute object characteristics measuring apparatus according to the fifth embodiment of the present invention.
Figure 33B:
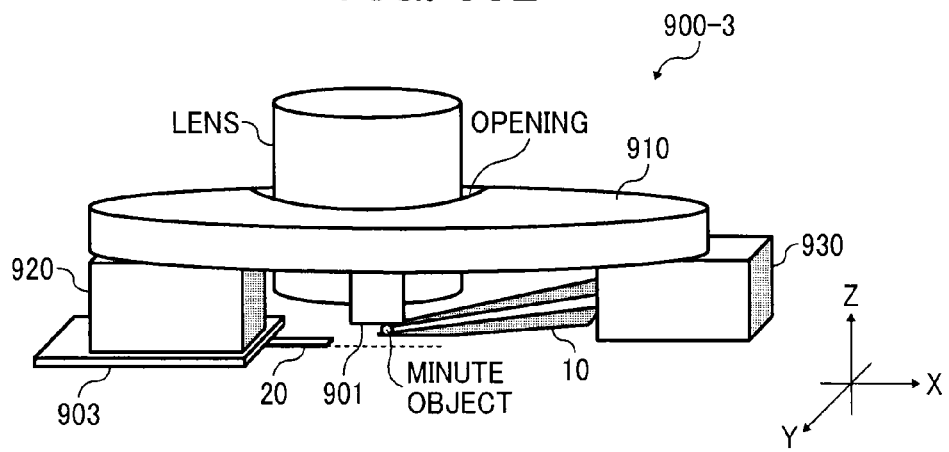
Figure 33C:
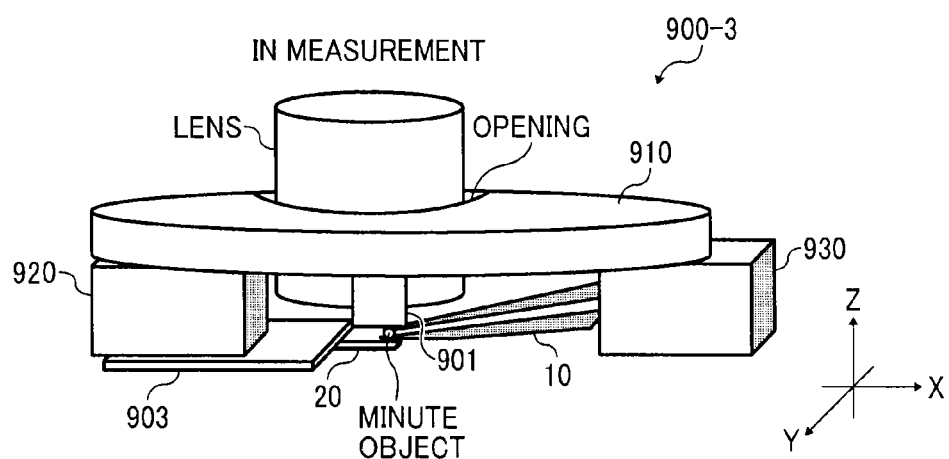

The positional relation between the holder 10 and the cantilever 20 in the vertical direction is not limited to the case where the holder 10 is positioned on the lower side of the cantilever 20, as is the case with FIGS. 30A and 30B and FIGS. 31A and 31B. As a third example, the holder 10 may be positioned on the upper side of the cantilever 20, as is the case with a minute object characteristics measuring apparatus 900-3 illustrated in FIGS. 33A to 33C. In the first and second examples, the holder 10 should be a micro/nano gripper or micro/nano tweezers that exposes the upper and lower surfaces of the minute object. In the third embodiment, the holder 10 may also be a micro/nano pipette that exposes only the lower surface of the minute object.

Use of Multiple Cantilevers

Figure 34:
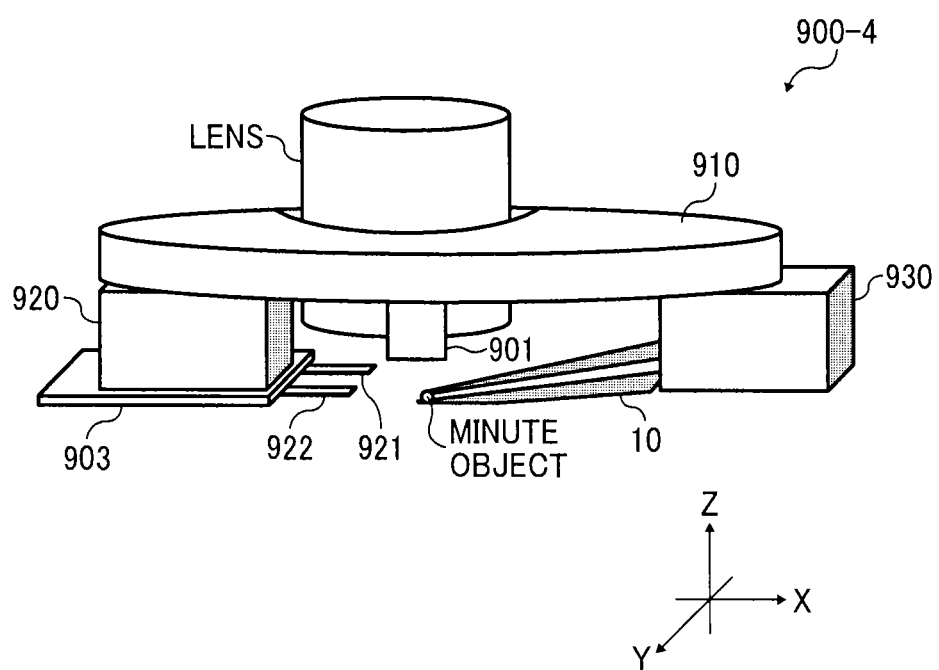
FIG. 34 is a schematic view of the fourth example of the minute object characteristics measuring apparatus according to the fifth embodiment of the present invention.

In the fifth embodiment, multiple characteristics of a minute object can be measured. A suitable spec of cantilever differs depending on the measurement detail. It is possible to change the type of cantilever in each measurement. Alternatively, as a fourth example, it is possible to provide multiple cantilevers each being position-variable, as is the case with a minute object characteristics measuring apparatus 900-4 illustrated in FIG. 34. In this case, multiple types of measurements can be performed effectively.

To make the multiple cantilevers position-variable, the cantilever holder 903 may be slidable in the Y-axis direction relative to the X stage 920X, or the horizontal movement stage 920 fixing the cantilever holder 903 may be movable in both the X-axis and Y-axis directions.

More specifically, only the cantilever holder 903 for holding cantilevers 921 and 992 for measuring the amount of charge and adhesive force, respectively, may be grounded, and another cantilever holder for holding a cantilever for measuring electric resistance/dielectric constant may form a circuit with a power source and an ammeter. The positions of the cantilevers are variable only by varying the position of the cantilever holders. Thus, it is possible to change the type of measurement in a short period of time. As a modification of the fourth example, the cantilever holder 903 for holding the cantilever 921 for measuring the amount of charge may have a voltage applying function for determining the charging polarity of the minute object.

According to the fifth embodiment of the present invention, the minute object characteristics measuring apparatus 900 includes a first driver (e.g., the horizontal movement stage 920) to drive the holder 10 and a second driver (e.g., the Z stage 930) to drive the cantilever 20 in a direction different from the driving direction of the first driver.

According to this embodiment, the specimen stage can be disposed on one side (e.g., the lower side) of the minute object characteristics measuring apparatus 900, providing a compact system capable of easily and rapidly performing collection and measurement of a minute object.

In addition to the first driver (e.g., the Z stage 930) holding the holder 10 and the second driver (e.g., the horizontal movement stage 920) holding the cantilever 20, the minute object characteristics measuring apparatus 900 further includes a support (e.g., the supporting member 910) supporting a measuring device (e.g., the optical lever).

Thus, the minute object characteristics measuring apparatus can be formed into a unit, which provides good usability.

The support has an opening or cutout into which the lens of a microscope is to be inserted. On the periphery of the opening or cutout of the support, the first and second drivers and the measuring device are disposed.

Thus, the minute object characteristics measuring apparatus can be mounted on the microscope as an add-on tool, thereby reducing mounting cost.

The support needs not necessarily have the opening or cutout into which the lens of a microscope is to be inserted.

Since the second driver is capable of driving the cantilever 20 in a direction perpendicular to the driving direction of the first driver driving the holder 10, it is easy to design the layout in which the cantilever 20 and the holder 10 do not interfere with each other. The driving directions of the first and second drivers need not necessarily be perpendicular to each other.

The first driver is capable of driving the holder 10 in the vertical direction, and the second driver is capable of driving the cantilever 20 in the horizontal direction.

Thus, a collection operation of the holder 10 to collect a minute object and a measurement operation using the holder 10 and the cantilever 20 can be easily and smoothly performed.

In the case where the second driver is capable of driving the cantilever 20 in a direction almost parallel to the installation direction (e.g., a longitudinal direction) of the holder 10, as the cantilever 20 is moved out of the field of microscope, the holder 10 can perform the collection operation. As the cantilever 20 is moved within the field of microscope, the holder 10 and the cantilever 20 can perform the measurement operation.

In the case where the second driver is capable of driving the cantilever 20 in a direction almost perpendicular to the installation direction (e.g., a longitudinal direction) of the holder 10, the position of the holder 10 relative to the longitudinal direction of the cantilever 20 is almost constant. Thus, the sensitivity in measuring adhesive force and the amount of charge is almost constant.

In the case where the holder 10 is disposed on the lower side of the cantilever 20 at measuring characteristics of a minute object, the moving distance of the holder 10 in the Z-axis direction can be set shorter than in the case where the holder 10 is disposed on the upper side of the cantilever 20. Thus, the selection of the drivers becomes much wider.

In the case where the holder 10 is disposed on the upper side of the cantilever 20 at measuring characteristics of a minute object, a micro/nano pipette may be used as the holder 10 since only the lower surface of the minute object has to be exposed.

In the fourth and fifth embodiments and Modifications 3 and 4 described above, a two-division detector is used as the optical detector. The two-division detector is not limited in configuration so long as having two or more light-receiving areas. A photodetector is preferably used therefor.

The configuration of the measuring device is not limited to those described above, so long as the displacement of the cantilever 20 can be measured. Preferably, the measuring device is configured to emit an optical wave, sonic wave, radio wave, etc., to the cantilever 20 and receive the reflected wave thereof.

The configuration of the holder 10 of the minute object characteristics measuring apparatus is not limited to that pinching a minute object or that adsorbing a minute object described above, so long as each one particle of minute object can be held.

In accordance with some embodiments of the present invention, the minute object characteristics measuring apparatus may include either a single holder or multiple holders. In the latter case, multiple holders having different sizes may be properly used depending on the particle diameter of the minute object. As another example, a holder that pinches a minute object or another holder that adsorbs a minute object may be properly used depending on the type or size of the minute object. According to another embodiment, it is possible to perform a measurement of a first minute object held by a first holder while a second minute object held by a second holder is waiting, and then to perform another measurement of the second minute object held by the second holder immediately after completion of the measurement of the first minute object. Thus, it is possible to more effectively measure multiple characteristics of the minute object.

In accordance with some embodiments of the present invention, the minute object characteristics measuring apparatus may include multiple holders and multiple cantilevers. In this case, for example, it is possible to measure homogeneous or heterogeneous characteristics of multiple minute objects at the same time as making a minute object held by one holder face with one cantilever and another minute object held by another holder face with another cantilever. In the case of measuring heterogeneous characteristics of multiple minute objects at the same time, it is possible to sequentially perform measurements by changing each combination of the holder holding a minute object and the cantilever.

In accordance with some embodiments of the present invention, the minute object characteristics measuring apparatus may not necessarily include the processor 60. In this case, the control by the processor 60 (e.g., micro-moving control for the micromotion stage 50) may be replaced with a manual control, or the calculation by the processor 60 may be performed by a person. Even in the case where the minute object characteristics measuring apparatus includes the processor 60, the micromotion stage 50 may be micro-moved manually, or the calculation by the processor 60 may be performed by a person.

The above-described embodiments have been conveyed by the inventors of the present invention based on the following thought process.

Nowadays, micron particles are used for various industrial products, pharmaceutical products, and food products. Toners for use in copiers and laser printers have been developed to become much smaller in particle size. In this industrial field, the smallest particle diameter achieves about 5 µm. Silica particles used as spacers between liquid crystal panels also have a particle size of about 5 µm. Micron particles are generally used for pharmaceutical products and food products such as flour. In the field of 3D printer, the market of which is rapidly spreading, one of dominant technologies includes powder additive manufacturing. Powder additive manufacturing now uses small powdery particles having a size of about 10 µm or less. As such fields using micron particles become huge, means for accurately evaluating various characteristics of the micron particles, such as adhesive property, charge property, electric resistance, and dielectric constant, is more demanded, to handle the micron particles more reliably and accurately. In accordance with the recent development of nanotechnology for operating or measuring minute objects, new technologies for evaluating micron particles one by one are being developed these days. In addition, means for evaluating characteristics (e.g., adhesive property) of human cells, having a size of several to several ten micrometers, is also demanded, to make the behavior of the cells clear.

In response to such demands, a method using atomic force microscope (AFM) has been proposed. Specifically, in the method, a particle is fixed on one end of a micro silicone cantilever with an adhesive, and the force acting on the particle is measured. As an example, in Reference 1 (JP-2003-330264-A) and Reference 2 (Mizuguchi, Yukiko and Miyamoto, Takahito, "Measuring Non-Electrostatic Adhesive Force between Solid Surfaces and Particles by Means of Atomic Force Microscopy", Konica Minolta Technology Report Vol. 1 (2004), pp. 19-22), an adhesive force between a cantilever and a particle is measured. Specifically, the particle is fixed on one end of the cantilever, and the particle and a specific member are repeatedly and continuously brought into contact with or drawn away from each other. The adhesive force is measured based on the amount of deflection of the cantilever at the time the particle and the surface of the member are separated from each other. As another example, in Reference 3 (Yoshinori Nishitani, Hiroaki Muramatu, Hiroyuki Maruyama, Ken-ichiro Tanoue, Shuji Matsusaka, Masuda Hiroaki (Kyoto University Graduate School of Engineering), "Measurement of Interaction Force between Particles and Wall Surfaces in Gas Phase by AFM", Collection of Papers for The Summer Symposium of The Society of Powder Technology, Japan (2000), pp. 67-69), the charging condition of a particle on one end of a cantilever is evaluated. Specifically, a grounded metal plate and the particle on the end on the cantilever are brought close to each other to generate a mirror force due to charges held by the particles, and the mirror force is measured based on the amount of deflection of the cantilever. As another example, in Reference 4 (J. W. Kwek, I. U. Vakarelski, W. K. Ng, J. Y. Y. Heng, and R. B. H. Tan, "Novel parallel plate condenser for single particle electrostatic force measurments in atomic force microscope", Colloids and Surfaces A: Physicochem. Eng. Aspects, 385 (2011) pp. 206-212), the amount of charge of a particle on one end of a cantilever is evaluated by measuring the amount of deflection of the cantilever at the time of inserting the particle on the end of the cantilever into between electrodes to which a voltage is applied. Reference 5 (JP-4649564-B, corresponding to JP-2007-212367-A) describes a method of measuring adhesive force of one particle using a particle capturing needle with a built-in spring, without using atomic force microscope. Reference 6 (JP-3600674-B, corresponding to JP-9-189727-A) describes a method of measuring electric resistance of a particle by pressing micro-electrodes on both ends of the particle.

As described above, various methods of measuring characteristics of one micron particle have been proposed. However, these methods have a common problem that measuring characteristics of one particle attached to a component or member with high degrees of accuracy and efficiency is difficult. With respect to the methods using atomic force microscope described in References 1 to 4, a process of fixing a particle on a cantilever is a bottleneck in terms of improvement of measurement efficiency. A particle is generally fixed on a cantilever with an epoxy adhesive. It takes several hours in total to apply the adhesive to the cantilever, bring the particle into contact with an end of the cantilever, and cure the adhesive.

The methods described in References 1 to 4 can also measure the adhesive force of a particle on a member in principle. However, it will take several ten hours to subject ten particles to the measurement of adhesive force, which is not practical. In addition, the amount of charge is difficult to measure in principle, since the charging condition of the particle is likely to change through the process of being fixed on the cantilever.

The method of measuring electric resistance described in Reference 6 needs a manipulator to arrange a particle on the electrodes. It is difficult to measure electric resistance of a particle by the method described in Reference 6 without the manipulator. However, conducting an evaluation with the method in combination with the manipulator cannot avoid decrease in measurement efficiency.

The method described in Reference 5, for measuring adhesive force of a particle, has a problem in measurement accuracy. The method described in Reference 5 calculates adhesive force by monitoring the frequency at the time that two measurement target objects are separated from each other. Due to such a mechanism for monitoring the vibration state at the time that the particle is separated while being held, the measurement value is easily influenced by vibration of the whole apparatus. This method described in Reference 5 is inferior to the methods described in References 1 to 4 each using atomic force microscope in terms of measurement accuracy.

In view of the above-described situation, instruments for measuring characteristics of micron-size minute objects attached to a specimen stage or member which can achieve a good balance between accuracy and efficiency are demanded.

In an effort to achieve a good balance between accuracy and efficiency, the inventors of the present invention have developed the minute object characteristics measuring apparatuses according to the first to third embodiments and modifications thereof, each of which having a holder for holding a minute object and a cantilever. These minute object characteristics measuring apparatuses can measure adhesive force, the amount of charge (mirror force), etc., by measuring the force acting on the cantilever when the holder and the cantilever are in contact with or close to each other. Such a minute object characteristics measuring apparatus can measure the force acting on the minute object with a high degree of accuracy while collecting or holding the minute object. One essence of the present invention is that each of the minute-object-holding function and the force-measuring function is given to a separate member. In particular, the holding function is given to a micro gripper, micro pipette, or tweezers, and the force-measuring function is given to the cantilever for use in atomic force microscope. Owing to the separation of the minute-object-holding function and the force-measuring function, a measurement method having the same degree of accuracy and a higher degree of efficiency compared to the methods described in References 1 to 4 is provided. In addition, when an electrode function is given to the cantilever and the holder, electric characteristics, such as electric resistance and dielectric constant, of a minute object can also be measured.

One advantage of the minute object characteristics measuring apparatuses according to the first to third embodiments and modifications thereof is that multiple measurement items can be covered by only replacing the cantilever with another. When quality evaluation or mechanism analysis is carried out by researchers and/or engineers, evaluating only one characteristics is insufficient in most cases. On the other hand, introducing multiple instruments in accordance with the analysis detail is very costly in terms of installation and maintenance. If a single minute object is to be subjected to multiple measurements of characteristics, the single minute object, being very small in size, should be transferred among the multiple instruments. Thus, a high degree of positioning technology is required and the time for evaluation is elongated. In accordance with some embodiments of the present invention, adhesive force, the amount of charge (mirror force), electric resistance, and dielectric constant can be measured by a single apparatus. In the case where the minute object characteristics measuring apparatus includes multiple cantilevers, multiple characteristics can be measured in a short period of time without an effort of replacing cantilever.

Various conventional problems have been solved by the minute object characteristics measuring apparatuses according to the first to third embodiments and modifications thereof, as described above, but some problems still remain. Two remaining problems are described below.

The first problem is that characteristics of a minute object cannot be measured with a high degree of accuracy when the holder is contaminated. In the targeted micron-size minute object, intermolecular force is dominant over gravity. Therefore, minute objects which are not the measurement target may unexpectedly attach to the holder to cause a contamination during the measurement. Such a contamination may cause an error in the measurement values. For example, the measured amount of charge may include that of the contaminant, and the measured electric resistance value may include that of the contaminant. Thus, it should be necessary to constantly check the contamination state of the holder and to immediately remove the contaminants, if any.

However, according to the first to third embodiments and modifications thereof, checking the contamination state of the holder and removing the contaminant are not easy. According to these embodiments, the measurement is performed under the observation of the holder with a microscope (e.g., optical microscope, electron microscope), but it is difficult to constantly check the contamination state of the whole holder by such a microscopic observation. The contamination state may be checked by, for example, once detaching the holder form the apparatus and visually observing the holder from various angles. However, this method is not practical because a long period of time is required. According to the first to third embodiments and modifications thereof, the contaminant may be physically removed by, for example, directly rubbing the holder against a member having a high adhesion property, such as urethane rubber. However, this method cannot be frequently performed because of requiring a long period of time in removing the contaminant and bearing a risk of damaging the holder.

The second problem is that, according to the first to third embodiments and modifications thereof, viscoelastic characteristics of a minute object cannot be measured with a high degree of accuracy. According to the first to third embodiments and modifications thereof, static viscoelasticity can be measured by measuring a force curve. However, since such a measurement of static viscoelasticity does not directly provide characteristic values, it is difficult to compare the measurement results.

In an effort to solve the above-described two problems, the inventors of the present invention have developed the minute object characteristics measuring apparatus 800 according to the fourth embodiment, including a holder for holding a minute object, a cantilever, a measuring system for measuring the force acting on the cantilever, a vibrator for vibrating the holder, and a measuring device for measuring the amount of displacement of the holder caused by the vibration.

According to the fourth embodiment, the minute object characteristics measuring apparatus 800 can easily check and reliably remove the contaminant attached to the holder. Thus, it is possible to measure characteristics of a minute object with a high degree of accuracy. The weight of the holder can be measured by measuring the vibration amplitude of the holder. Thus, it is easy to detect a weight change of the holder caused by a contamination without directly observing of the holder. In the case where the contamination is detected, the contaminant can be removes by vibrating the holder. Moreover, by measuring a weight change of the holder again, whether the contaminant has been removed or not can be determined.

According to the fourth embodiment, the minute object characteristics measuring apparatus 800 can measure viscoelasticity of a minute object with a high degree of accuracy. In particular, dynamic viscoelasticity of a minute object can be measured by vibrating the minute object with the holder, bringing the minute object into contact with the cantilever, and measuring the displacement and phase shift of the cantilever. By plugging in the measured values in adequate model formulae, comparable viscoelastic characteristic values, such as storage elastic modulus and loss elastic modulus, can be obtained. Thus, viscoelasticity of a minute object can be quantitatively measured with a high degree of accuracy.

Various conventional problems have been solved by the minute object characteristics measuring apparatuses according to the first to fourth embodiments and modifications thereof, as described above, but some problems still remain. Specifically, in implementing the above-described technologies, multiple special devices, such as the force-detecting system including the holder for holding a minute object and the cantilever, the electrodes, the specimen stage, the XY stage, etc., should be systematized, which may increase the installation cost. When the apparatus is frequently used, the installation and maintenance costs for the special devices can be retrieved. On the other hand, when the apparatus is less frequently used or an as-early-as-possible start of the measurement is demanded, there may be a need for a low-cost apparatus which can be installed in a short delivery period.

According to the first to fourth embodiments and modifications thereof, the apparatus dimension becomes large since the specimen stage and the force-detecting system should be installed on a stage. It is difficult to install them on a stage of an optical microscope, the length of each side is about 5 to 10 cm. The stage has to move either a long distance, or a micron-order distance when holding a minute object. Therefore, the evaluation time period would be not a practical length unless an automatic stage is introduced. The installation area has to be large, either.

In view of the above-described situation, low-cost and compact instruments for measuring characteristics of micron-size minute objects attached to a member, etc., are demanded.

The inventors of the present invention have developed the minute object characteristics measuring apparatus 900 according to the fifth embodiment, including a holder for holding a minute object, a cantilever, a measuring system for measuring the force acting on the cantilever, and a driving system for driving the cantilever in the horizontal direction. Specifically, the minute object characteristics measuring apparatus 900 includes a ring-like supporting member equipped with a force-detecting system including the holder and the cantilever. The driver performs position adjustment so that the cantilever is not present in the field of an optical microscope at the time of holding a minute object, and that the cantilever is positioned above the minute object held by the holder at the time of measuring characteristics of the minute object. The minute object characteristics measuring apparatus 900 according to the fifth embodiment can be mounted on the optical lens of a conventional optical microscope as an add-on tool. According to the fifth embodiment, adhesive force, the amount of charge, electric resistance, and dielectric constant, which can be measured according to the first to fourth embodiments and modifications thereof, can also be measured.

According to the fifth embodiment, the apparatus can be compact in size since only the specimen stage has to be placed on the stage. For the position adjustment at the time of holding the minute object, a manual or automatic driver for driving the specimen stage in the X-axis and Y-axis directions is necessary.

According to the fifth embodiment, the minute object characteristics measuring apparatus 900 can measure characteristics of a minute object with a low-cost compact apparatus.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

What is claimed is:

1. A minute object characteristics measuring apparatus, comprising:
   a holder to hold a minute object;
   a cantilever to face the minute object held by the holder;
   a measuring device to measure a displacement of the cantilever;
   a driver to drive one of the holder holding the minute object and the cantilever in a direction that the minute object held by the holder and the cantilever are brought close to or drawn away from each other; and
   a processor to control the driver and to determine characteristics of the minute object based on a measurement result from the measuring device,
   wherein the cantilever is conductive and grounded, and
   wherein the processor determines a mirror force of the minute object based on an amount of the displacement of the cantilever at the time that the minute object held by the holder and the cantilever are brought close to each other.

2. The minute object characteristics measuring apparatus according to claim 1, wherein the processor determines an adhesive force of the minute object based on an amount of the displacement of the cantilever at the time that the minute object held by the holder and the cantilever, having been in contact with each other, are separated from each other.

3. The minute object characteristics measuring apparatus according to claim 1, further comprising a charger to charge the cantilever,
   wherein the processor determines a charging polarity of the minute object based on a direction of the displacement of the cantilever at the time that the minute object held by the holder and the cantilever are brought close to each other.

4. The minute object characteristics measuring apparatus according to claim 1, wherein the driver is capable of integrally driving the cantilever and the measuring device in the direction that the minute object held by the holder and the cantilever are brought close to or drawn away from each other.

5. The minute object characteristics measuring apparatus according to claim 1, wherein the holder is capable of adsorbing the minute object.

6. A minute object characteristics measuring apparatus, comprising:
- a holder to hold a minute object, the holder having conductivity;
- a cantilever to face the minute object held by the holder, the cantilever having conductivity;
- a driver to drive one of the holder holding the minute object and the cantilever in a direction that the minute object held by the holder and the cantilever are brought close to or drawn away from each other;
- a power source having polar opposites, each of the polar opposites independently connected to the holder or the cantilever; and
- an ammeter to measure a current flowed in the minute object when the holder and the cantilever are electrically continuous through the minute object,
- wherein the holder has a pair of arms capable of gripping the minute object, and
- wherein, when the minute object gripped by the pair of arms and the cantilever are in contact with each other, one of the arms and the cantilever are electrically continuous and the other arm and the cantilever are not electrically continuous.

7. The minute object characteristics measuring apparatus according to claim 6, further comprising a measuring device to measure a displacement of the cantilever.

8. The minute object characteristics measuring apparatus according to claim 6, wherein the minute object characteristics measuring apparatus measures an electric resistance of the minute object.

9. The minute object characteristics measuring apparatus according to claim 6, further comprising a voltmeter to measure a voltage applied to the minute object when the holder and the cantilever are electrically continuous through the minute object,
- wherein the power source is an alternating-current power source, and
- wherein the minute object characteristics measuring apparatus measures at least one of a dielectric constant or an electric resistance of the minute object.

10. A minute object characteristics measuring apparatus, comprising:
- a holder to hold a minute object;
- a cantilever to face the minute object held by the holder;
- a measuring device to measure a displacement of the cantilever; and
- a driver to drive one of the holder holding the minute object and the cantilever in a direction that the minute object held by the holder and the cantilever are brought close to or drawn away from each other,
- wherein the holder has a pair of arms capable of gripping the minute object.

* * * * *